United States Patent
Chen et al.

(10) Patent No.: US 9,176,300 B2
(45) Date of Patent: Nov. 3, 2015

(54) IMAGING LENS ASSEMBLY, IMAGING DEVICE AND VEHICLE PHOTOGRAPHING DEVICE

(71) Applicant: LARGAN PRECISION CO., LTD., Taichung (TW)

(72) Inventors: Kuan-Ming Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 66 days.

(21) Appl. No.: 14/270,808

(22) Filed: May 6, 2014

(65) Prior Publication Data

US 2015/0268446 A1    Sep. 24, 2015

(30) Foreign Application Priority Data

Mar. 24, 2014    (TW) .............................. 103110833 A

(51) Int. Cl.
| | |
|---|---|
| *G02B 9/62* | (2006.01) |
| *G02B 13/00* | (2006.01) |
| *G02B 1/04* | (2006.01) |
| *H04N 5/225* | (2006.01) |
| *B60R 1/00* | (2006.01) |

(52) U.S. Cl.
CPC .............. *G02B 9/62* (2013.01); *G02B 13/0045* (2013.01); *B60R 1/00* (2013.01); *G02B 1/041* (2013.01); *H04N 5/2254* (2013.01)

(58) Field of Classification Search
CPC .................................. G02B 1/041; G02B 9/62
USPC .......................................... 359/713, 754, 756
See application file for complete search history.

(56) References Cited

U.S. PATENT DOCUMENTS

| | | | |
|---|---|---|---|
| 5,200,861 A | 4/1993 | Moskovich | |
| 5,278,698 A | 1/1994 | Iizuka et al. | |
| 5,682,269 A * | 10/1997 | Kimura .................... | G02B 9/60 359/752 |
| 6,377,404 B1 * | 4/2002 | Goosey, Jr. .......... | G02B 15/177 359/682 |
| 2006/0087747 A1 * | 4/2006 | Ohzawa ................. | G02B 13/18 359/749 |
| 2012/0206822 A1 * | 8/2012 | Hsieh ..................... | G02B 13/06 359/753 |
| 2013/0235473 A1 * | 9/2013 | Chen .................. | G02B 13/0045 359/713 |
| 2013/0279021 A1 * | 10/2013 | Chen .................. | G02B 13/0045 359/713 |
| 2014/0029115 A1 | 1/2014 | Liao et al. | |
| 2014/0043695 A1 * | 2/2014 | Hsu ......................... | G02B 9/62 359/713 |
| 2014/0055558 A1 * | 2/2014 | Souma ............... | H04N 5/23238 348/36 |

FOREIGN PATENT DOCUMENTS

| | | |
|---|---|---|
| CN | 201837770 | 5/2011 |
| TW | 201418764 | 5/2014 |

* cited by examiner

*Primary Examiner* — Zachary Wilkes
*Assistant Examiner* — William R Alexander
(74) *Attorney, Agent, or Firm* — Locke Lord LLP; Tim Tingkang Xia, Esq.

(57) ABSTRACT

An imaging lens assembly includes, in order from an object side to an image side, a first lens element, a second lens element, a third lens element, a fourth lens element, a fifth lens element, and a sixth lens element. The first lens element with negative refractive power has an object-side surface being convex in a paraxial region thereof and an image-side surface being concave in a paraxial region thereof. The second lens element has an object-side surface being concave in a paraxial region thereof and an image-side surface being convex in a paraxial region thereof. The third lens element has an object-side surface being convex in a paraxial region thereof. The fourth lens element has negative refractive power. The fifth lens element has positive refractive power. The sixth lens element has an image-side surface being concave in a paraxial region thereof.

23 Claims, 16 Drawing Sheets

IMAGING LENS ASSEMBLY, IMAGING DEVICE AND VEHICLE PHOTOGRAPHING DEVICE

RELATED APPLICATIONS

This application claims priority to Taiwan Application Serial Number 103110833, filed Mar. 24, 2014, which is incorporated by reference herein in its entirety.

BACKGROUND

1. Technical Field

The present disclosure relates to an imaging lens assembly, an imaging device and a vehicle photographing device. More particularly, the present disclosure relates to a compact imaging lens assembly and an imaging device applicable to a vehicle photographing device.

2. Description of Related Art

In recent years, vehicle recording cameras, such as dashcams are becoming more and more popular. The vehicle recording cameras enable drivers to provide video evidence when they get involved in an accident. Furthermore, the rear-view cameras enable drivers to reverse their vehicles easier and avoid accidents.

The vehicle recording camera especially focuses on image recognition; however, a conventional optical system employed in a vehicle recording camera is not favorable for resolving power and distortion in a peripheral region of an image which cannot satisfy the aforementioned requirement.

The conventional optical system employed in a vehicle recording camera mainly adopts a structure with six lens elements. However, the surface shape of the lens elements and arrangement of refractive powers are not favorable for reducing the incident angle on the lens elements, high-order aberrations and providing sufficient illumination. In addition, the conventional optical system with six lens elements is also not favorable for reducing the back focal length of the optical system with wide viewing angle, keeping the optical system compact and correcting the distortion.

SUMMARY

According to one aspect of the present disclosure, an imaging lens assembly includes, in order from an object side to an image side, a first lens element, a second lens element, a third lens element, a fourth lens element, a fifth lens element, and a sixth lens element. The first lens element with negative refractive power has an object-side surface being convex in a paraxial region thereof and an image-side surface being concave in a paraxial region thereof. The second lens element with refractive power has an object-side surface being concave in a paraxial region thereof and an image-side surface being convex in a paraxial region thereof. The third lens element with refractive power has an object-side surface being convex in a paraxial region thereof. The fourth lens element has negative refractive power. The fifth lens element has positive refractive power. The sixth lens element with refractive power has an image-side surface being concave in a paraxial region thereof, wherein the image-side surface of the sixth lens element has at least one inflection point in an off-axis region thereof, and both of an object-side surface and the image-side surface of the sixth lens element are aspheric. The imaging lens assembly has a total of six lens elements with refractive power. At least three lens elements among the first through the sixth lens elements of the imaging lens assembly are made of plastic material.

According to another aspect of the present disclosure, an imaging device includes the imaging lens assembly according to the aforementioned aspect and an image sensor, wherein the image sensor is disposed on the image side of the imaging lens assembly.

According to still another aspect of the present disclosure, a vehicle photographing device includes the imaging device according to the aforementioned aspect.

According to yet another aspect of the present disclosure, an imaging lens assembly includes, in order from an object side to an image side, a first lens element, a second lens element, a third lens element, a fourth lens element, a fifth lens element, and a sixth lens element. The first lens element with negative refractive power has an image-side surface being concave in a paraxial region thereof. The second lens element with refractive power has an object-side surface being concave in a paraxial region thereof and an image-side surface being convex in a paraxial region thereof. The third lens element with positive refractive power has an object-side surface being convex in a paraxial region thereof and an image-side surface being convex in a paraxial region thereof. The fourth lens element has negative refractive power. The fifth lens element with positive refractive power has an object-side surface being convex in a paraxial region thereof. The sixth lens element with refractive power has an image-side surface being concave in a paraxial region thereof, wherein the image-side surface of the sixth lens element has at least one inflection point in an off-axis region thereof, and both of an object-side surface and the image-side surface of the sixth lens element are aspheric. The imaging lens assembly has a total of six lens elements with refractive power. At least three lens elements among the first through the sixth lens elements of the imaging lens assembly are made of plastic material.

According to still yet another aspect of the present disclosure, an imaging lens assembly includes, in order from an object side to an image side, a first lens element, a second lens element, a third lens element, a fourth lens element, a fifth lens element, and a sixth lens element. The first lens element with negative refractive power has an image-side surface being concave in a paraxial region thereof. The second lens element with refractive power has an object-side surface being concave in a paraxial region thereof and an image-side surface being convex in a paraxial region thereof. The third lens element has refractive power. The fourth lens element has negative refractive power. The fifth lens element has positive refractive power. The sixth lens element with negative refractive power has an image-side surface being concave in a paraxial region thereof, wherein the image-side surface of the sixth lens element has at least one inflection point in an off-axis region thereof, and both of an object-side surface and the image-side surface of the sixth lens element are aspheric. The imaging lens assembly has a total of six lens elements with refractive power. At least three lens elements among the first through the sixth lens elements of the imaging lens assembly are made of plastic material.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
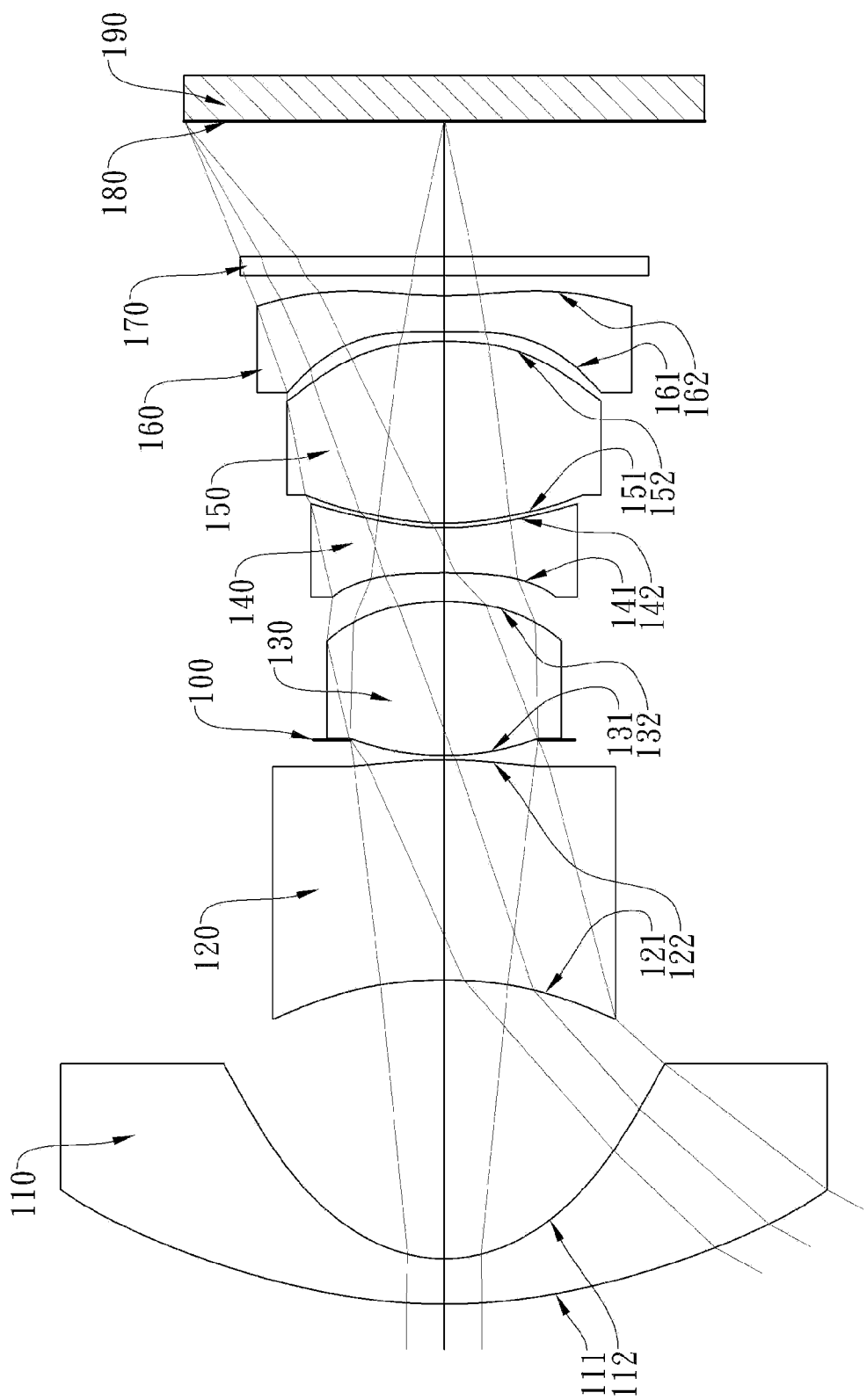
FIG. 1A is a schematic view of an imaging device according to the 1st embodiment of the present disclosure.

An imaging lens assembly includes, in order from an object side to an image side, a first lens element, a second lens element, a third lens element, a fourth lens element, a fifth lens element, and a sixth lens element. The imaging lens assembly has a total of six lens elements with refractive power, and at least three lens elements among the first through the sixth lens elements of the imaging lens assembly are made of plastic material.

The first lens element with negative refractive power has an object-side surface being convex in a paraxial region thereof and an image-side surface being concave in a paraxial region thereof, so that it is favorable for enlarging the viewing angle of the imaging lens assembly.

The second lens element has an object-side surface being concave in a paraxial region thereof and an image-side surface being convex in a paraxial region thereof. Therefore, it is favorable for reducing the incident angle on the lens elements of the imaging lens assembly, correcting the high-order aberrations, and improving the illumination.

The third lens element can have positive refractive power, so that it provides the imaging lens assembly with the positive refractive power as it needs to be so as to reduce its total track length thereof. The third lens element can have an object-side surface being convex in a paraxial region thereof and an image-side surface being convex in a paraxial region thereof, so that it is favorable for correcting the spherical aberration of the imaging lens assembly.

The fourth lens element has negative refractive power. Therefore, it is favorable for correcting the aberration produced by the third lens element with positive refractive power.

The third lens element with positive refractive power and the fourth lens element with negative refractive power can form a structure of positive-negative telephoto structure, so that it is favorable for reducing the total track length of the imaging lens assembly. Furthermore, the fourth lens element can have an object-side surface being concave in a paraxial region thereof and an image-side surface being concave in a paraxial region thereof, so that it is favorable for correcting the aberration of the imaging lens assembly.

The fifth lens element has positive refractive power, so that it is favorable for reducing the aberration and astigmatism near the object side and balancing the arrangement of positive refractive powers. The fifth lens element can have an object-side surface being convex in a paraxial region thereof, so that it is favorable for correcting the distortion and high-order aberration of the imaging lens assembly so as to improve the resolving power. The fifth lens element can have an image-side surface being convex in a paraxial region thereof, so that it is favorable for correcting the aberration of the imaging lens assembly.

The sixth lens element can have negative refractive power, so that the principal point of the imaging lens assembly can be positioned away from the image plane so as to reduce the total track length of the imaging lens assembly and further keep a compact size thereof. The sixth lens element has an image-side surface being concave in a paraxial region thereof, wherein the image-side surface of the sixth lens element has at least one inflection point in an off-axis region thereof. Therefore, it is favorable for reducing the back focal length of the imaging lens assembly with large viewing angle functionality so as to further keep the imaging lens assembly compact. The sixth lens element can also correct the image distortion of the imaging lens assembly with large viewing angle functionality by having at least one inflection point on the sixth lens element.

When an axial distance between the first lens element and the second lens element is T12, and a central thickness of the second lens element is CT2, the following condition is satisfied: $0.5 < T12/CT2 < 1.5$. Therefore, the axial distance between the first lens element and the second lens element will be proper favorable for assembling the lens elements. It is also favorable for manufacturing and molding the lens element, and increasing the manufacturing yield rate by properly adjusting the central thickness of the second lens element.

When a curvature radius of the object-side surface of the second lens element is R3, and a curvature radius of the image-side surface of the second lens element is R4, the following condition is satisfied: $3.0 < |(R3+R4)/(R3-R4)|$. Therefore, the surface shape of the second lens element will be favorable for correcting the high-order aberration and improving the illumination of the imaging lens assembly.

When a curvature radius of the object-side surface of the third lens element is R5, and a curvature radius of the image-side surface of the third lens element is R6, the following condition is satisfied: $|(R5+R6)/(R5-R6)| < 0.60$. Therefore, the surface shape of the third lens element will be favorable for correcting the aberration and reducing the astigmatism.

When a curvature radius of the object-side surface of the sixth lens element is R11, and a curvature radius of the image-side surface of the sixth lens element is R12, the following condition is satisfied: $0 < R12/|R11| < 2.0$. Therefore, the surface shapes of the sixth lens element will be favorable for reducing the back focal length of the imaging lens assembly with large viewing angle so as to keep a compact size thereof. Preferably, the following condition is satisfied: $0 < R12/|R11| < 1.0$.

When a maximal field of view of the imaging lens assembly is FOV, the following condition is satisfied: 110 deg.<FOV<200 deg. Therefore, the imaging lens assembly can have larger viewing angle functionality so as to obtain more of the image scene.

When an f-number of the imaging lens assembly is Fno, the following condition is satisfied: 1.6<Fno<2.4. Therefore, it is favorable for improving the illumination in a peripheral region of the imaging lens assembly When a focal length of the imaging lens assembly is f, a focal length of the first lens element is f1, a focal length of the second lens element is f2, a focal length of the third lens element is f3, a focal length of the fourth lens element is f4, a focal length of the fifth lens element is f5, and a focal length of the sixth lens element is f6, the following condition is satisfied: |f/fx|<1.2; and x=1~6. Therefore, it is favorable for balancing the refractive powers of the lens elements of the imaging lens assembly so as to reduce the photosensitivity and reduce the total track length thereof.

When the focal length of the imaging lens assembly is f, and the focal length of the sixth lens element is f6, the following condition is satisfied: −0.50<f/f6<0. Therefore, the refractive power of the sixth lens element is favorable for controlling the photosensitivity and correcting the aberration of the imaging lens assembly.

When an Abbe number of the sixth lens element is V6, the following condition is satisfied: V6<30. It is favorable for correcting the chromatic aberration of the imaging lens assembly.

According to the imaging lens assembly of the present disclosure, the lens elements thereof can be made of glass or plastic material. When the lens elements are made of glass material, the distribution of the refractive power of the imaging lens assembly may be more flexible to design. When the lens elements are made of plastic material, the manufacturing cost can be effectively reduced. Furthermore, surfaces of each lens element can be arranged to be aspheric (ASP), since the aspheric surface of the lens element is easy to form a shape other than spherical (SPH) surface so as to have more controllable variables for eliminating the aberration thereof, and to further decrease the required number of the lens elements. Therefore, the total track length of the imaging lens assembly can also be reduced.

According to the imaging lens assembly of the present disclosure, each of an object-side surface and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the imaging lens assembly of the present disclosure, the imaging lens assembly can include at least one stop, such as an aperture stop, a glare stop or a field stop. Said glare stop or said field stop is for eliminating the stray light and thereby improving the image resolution thereof.

According to the imaging lens assembly of the present disclosure, an aperture stop can be configured as a front stop or a middle stop. A front stop disposed between an imaged object and the first lens element can provide a longer distance between an exit pupil of the imaging lens assembly and the image plane and thereby improves the image-sensing efficiency of an image sensor. A middle stop disposed between the first lens element and the image plane is favorable for enlarging the field of view of the imaging lens assembly and thereby provides a wider field of view for the same.

The present imaging lens assembly can be optionally applied to moving focus optical systems. Therefore, it is favorable for correcting aberration and providing good image quality.

According to the present disclosure, an imaging device is provided. The imaging device includes the imaging lens assembly according to the aforementioned imaging lens assembly of the present disclosure, and an image sensor, wherein the image sensor is located on the image side of the aforementioned imaging lens assembly, that is, the image sensor can be disposed on or near an image plane of the aforementioned imaging lens assembly. Moreover, the second lens element has an object-side surface being concave in a paraxial region thereof and an image-side surface being convex in a paraxial region thereof; therefore, it is favorable for reducing the incident angle on the lens elements of the imaging lens assembly, correcting the high-order aberration, and improving the illumination of the imaging lens assembly. The sixth lens element has an image-side surface being concave in a paraxial region thereof and the image-side surface of the sixth lens element has at least one inflection point in an off-axis region thereof. Therefore, it is favorable for correcting image distortion of the imaging lens assembly with large viewing angle by arranging the image-side surface of the sixth lens element has at least one inflection point. In some embodiments, the imaging device can further include a barrel member, a holding member or a combination thereof.

Figure 8A:
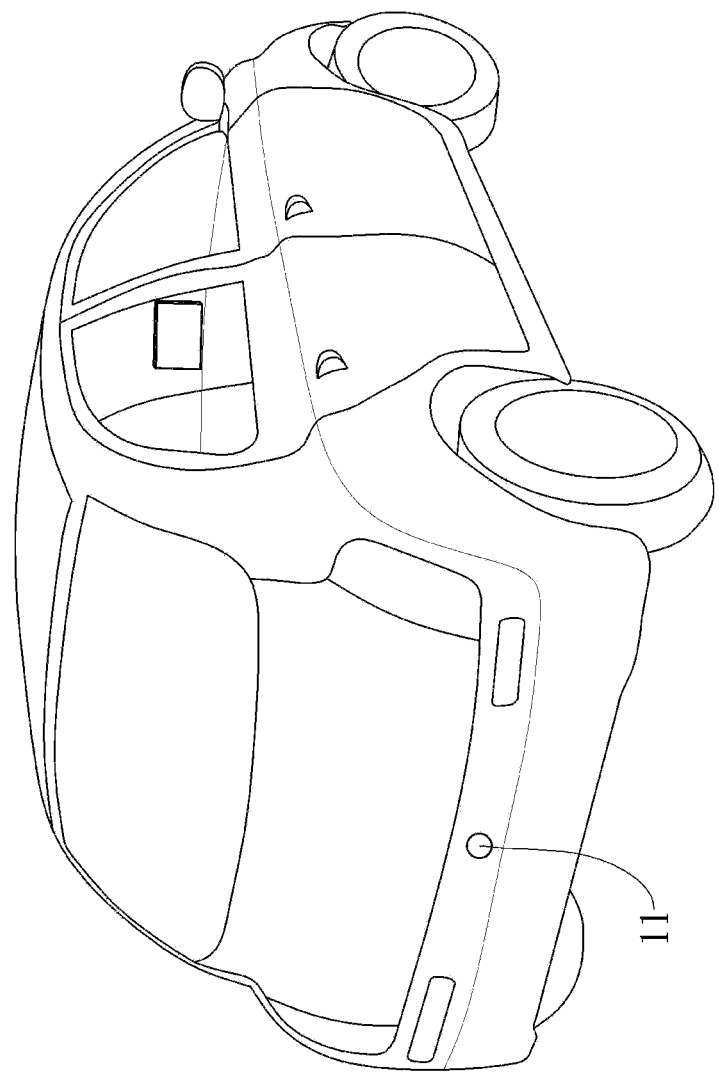
FIG. 8A shows a vehicle photographing device according to the present disclosure.
Figure 8B:
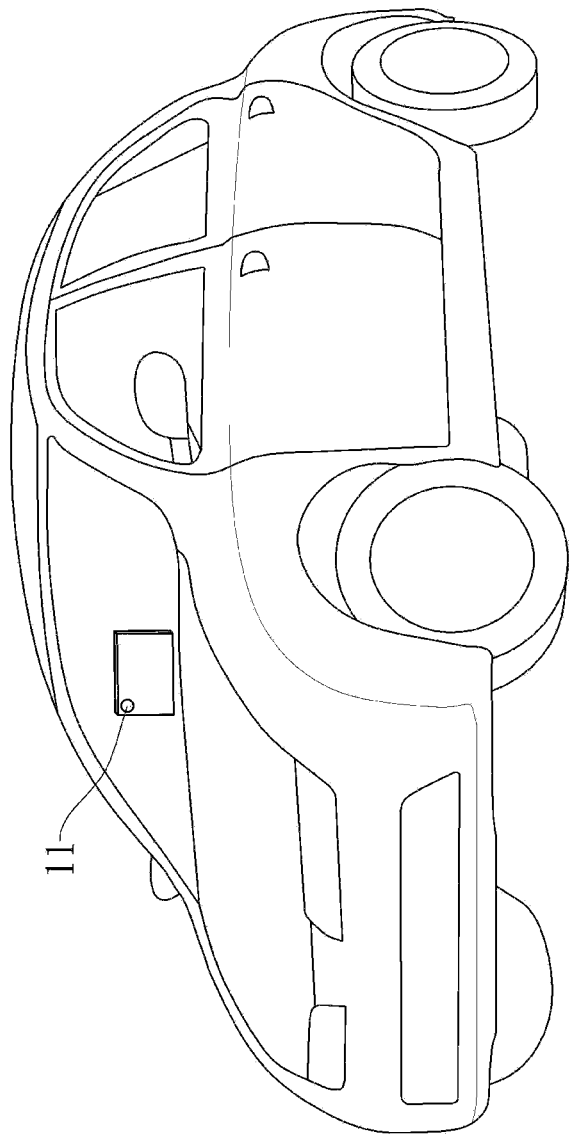
FIG. 8B shows another vehicle photographing device according to the present disclosure.

In FIG. 8A and FIG. 8B, an imaging device 11 may be installed in but not limited to a vehicle photographing device, including a rear-view camera (FIG. 8A) or a vehicle recording camera (FIG. 8B). In some embodiments, the vehicle photographing device can further include, but not limited to, display, a control unit, a random access memory unit (RAM), a read only memory unit (ROM) or a combination thereof.

According to the above description of the present disclosure, the following specific embodiments are provided for further explanation.

1st Embodiment

Figure 1B:
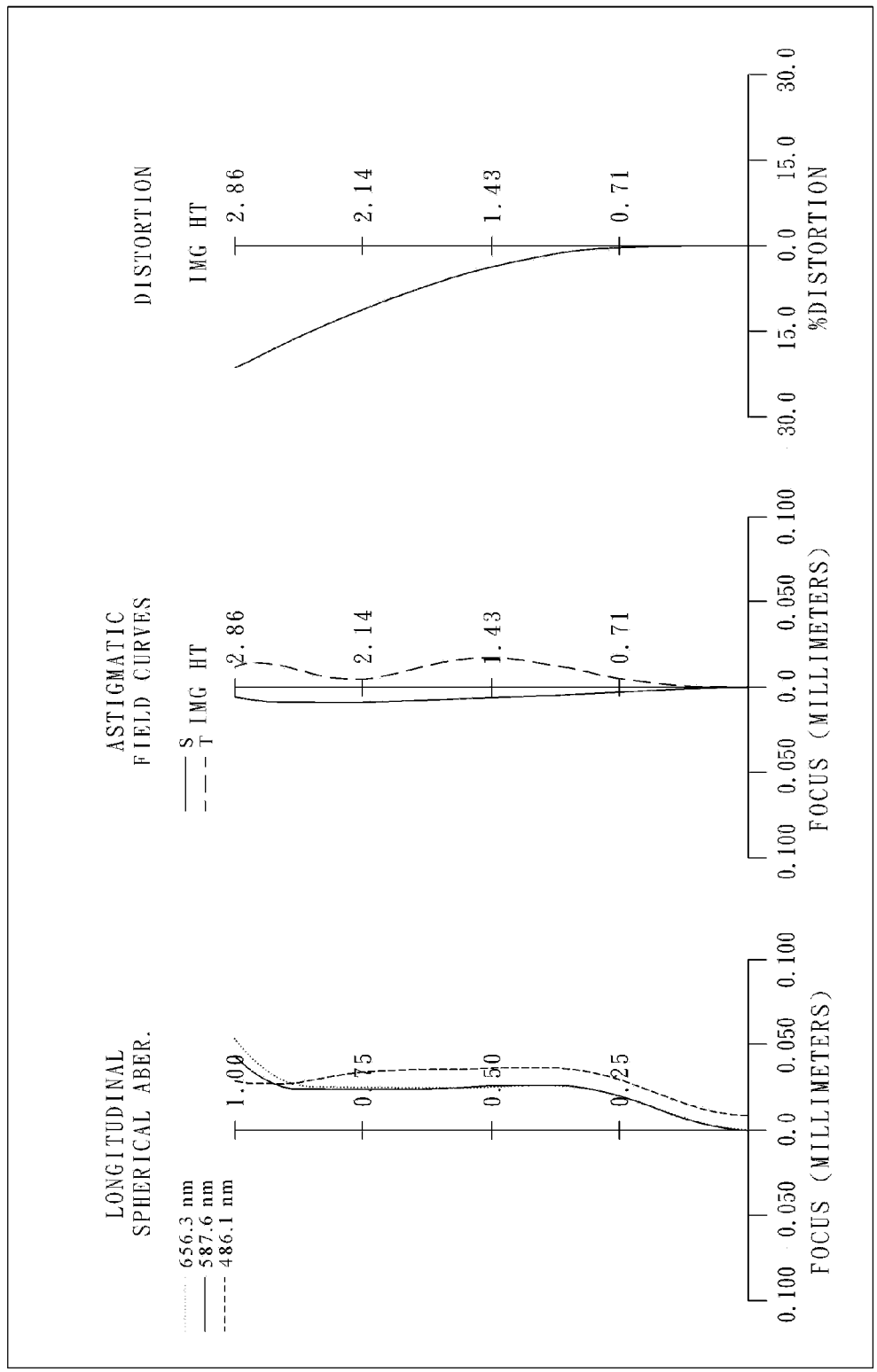
FIG. 1B shows spherical aberration curves, astigmatic field curves and a distortion curve of the imaging device according to the 1st embodiment.

FIG. 1A is a schematic view of an imaging device according to the 1st embodiment of the present disclosure. FIG. 1B shows, in order from left to right, spherical aberration curves, astigmatic field curves and a distortion curve of the imaging device according to the 1st embodiment. In FIG. 1A, the imaging device includes the imaging lens assembly (not otherwise herein labeled) of the present disclosure and an image sensor 190. The imaging lens assembly includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image plane 180, wherein the imaging lens assembly has a total of six lens elements (110-160) with refractive power.

The first lens element 110 with negative refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of plastic material and has the object-side surface 131 and the image-side surface 132 being both aspheric.

The fourth lens element 140 with negative refractive power has an object-side surface 141 being concave in a paraxial region thereof and an image-side surface 142 being concave in a paraxial region thereof. The fourth lens element 140 is made of plastic material and has the object-side surface 141 and the image-side surface 142 being both aspheric.

The fifth lens element 150 with positive refractive power has an object-side surface 151 being convex in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof, wherein the image-side surface 162 of the sixth lens element 160 has at least one inflection point in an off-axis region thereof. The sixth lens element 160 is made of plastic material and has the object-side surface 161 and the image-side surface 162 being both aspheric.

The IR-cut filter 170 is made of glass and located between the sixth lens element 160 and the image plane 180, and will not affect the focal length of the imaging lens assembly. The image sensor 190 is disposed on or near the image plane 180 of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging lens assembly of the imaging device according to the 1st embodiment, when a focal length of the imaging lens assembly is f, an f-number of the imaging lens assembly is Fno, and half of a maximal field of view of the imaging lens assembly is HFOV, these parameters have the following values: f=2.00 mm; Fno=2.40; and HFOV=61.4 degrees.

In the imaging lens assembly of the imaging device according to the 1st embodiment, when an axial distance between the first lens element 110 and the second lens element 120 is T12, and a central thickness of the second lens element 120 is CT2, the following condition is satisfied: T12/CT2=1.27.

In the imaging lens assembly of the imaging device according to the 1st embodiment, when an Abbe number of the sixth lens element 160 is V6, the following condition is satisfied: V6=23.8.

In the imaging lens assembly of the imaging device according to the 1st embodiment, when a curvature radius of the object-side surface 121 of the second lens element 120 is R3, and a curvature radius of the image-side surface 122 of the second lens element 120 is R4, the following condition is satisfied: |(R3+R4)/(R3−R4)|=23.29.

In the imaging lens assembly of the imaging device according to the 1st embodiment, when a curvature radius of the object-side surface 131 of the third lens element 130 is R5, and a curvature radius of the image-side surface 132 of the third lens element 130 is R6, the following condition is satisfied: |(R5+R6)/(R5−R6)|=0.03.

In the imaging lens assembly of the imaging device according to the 1st embodiment, when a curvature radius of the object-side surface 161 of the sixth lens element 160 is R11, and a curvature radius of the image-side surface 162 of the sixth lens element 160 is R12, the following condition is satisfied: R12/|R11|=0.22.

In the imaging lens assembly of the imaging device according to the 1st embodiment, when a maximal field of view of the imaging lens assembly is FOV, the following condition is satisfied: FOV=122.8 deg.

In the imaging lens assembly of the imaging device according to the 1st embodiment, when the focal length of the imaging lens assembly is f, and a focal length of the sixth lens element 160 is f6, the following condition is satisfied: f/f6=−0.23.

In the imaging lens assembly of the imaging device according to the 1st embodiment, when the focal length of the imaging lens assembly is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and the focal length of the sixth lens element 160 is f6, the following condition is satisfied: |f/fx|(maximum value)=0.66; and x=1~6.

The detailed optical data of the 1st embodiment are shown in Table 1 and the aspheric surface data are shown in Table 2 below.

TABLE 1

1st Embodiment
f = 2.00 mm, Fno = 2.40, HFOV = 61.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.206 | ASP | 0.500 | Plastic | 1.535 | 56.3 | −4.31 |
| 2 | | 1.634 | ASP | 3.065 | | | | |
| 3 | Lens 2 | −4.758 | ASP | 2.419 | Plastic | 1.544 | 55.9 | 106.63 |
| 4 | | −5.185 | ASP | 0.220 | | | | |
| 5 | Ape. Stop | Plano | | −0.170 | | | | |
| 6 | Lens 3 | 3.011 | ASP | 1.693 | Plastic | 1.535 | 56.3 | 3.04 |

TABLE 1-continued

1st Embodiment
f = 2.00 mm, Fno = 2.40, HFOV = 61.4 deg.

| Surface # | | Curvature Radius | Thickness | Material | Index | Abbe # | Focal Length |
|---|---|---|---|---|---|---|---|
| 7 | | −2.841 ASP | 0.311 | | | | |
| 8 | Lens 4 | −10.819 ASP | 0.500 | Plastic | 1.634 | 23.8 | −3.49 |
| 9 | | 2.827 ASP | 0.050 | | | | |
| 10 | Lens 5 | 2.857 ASP | 2.000 | Plastic | 1.544 | 55.9 | 3.53 |
| 11 | | −4.408 ASP | 0.100 | | | | |
| 12 | Lens 6 | 19.422 ASP | 0.400 | Plastic | 1.634 | 23.8 | −8.61 |
| 13 | | 4.227 ASP | 0.222 | | | | |
| 14 | IR-cut filter | Plano | 0.210 | Glass | 1.517 | 64.2 | — |
| 15 | | Plano | 1.487 | | | | |
| 16 | Image | Plano | — | | | | |

Note:
Reference wavelength is 587.6 nm (d-line)

TABLE 2

Aspheric Coefficients

| Surface # | 1 | 2 | 3 | 4 | 6 | 7 |
|---|---|---|---|---|---|---|
| k = | −8.5054E+00 | −9.3836E−01 | 1.0800E+00 | −8.8634E+01 | 2.9764E−02 | 2.2389E+00 |
| A4 = | 1.2262E−03 | 5.0482E−03 | −8.9748E−03 | −3.8627E−02 | 1.6367E−02 | −5.0199E−02 |
| A6 = | −7.4782E−06 | 1.1988E−03 | 9.6202E−04 | 4.9735E−02 | −2.3109E−02 | 2.1608E−02 |
| A8 = | −2.2015E−06 | 1.5813E−04 | 5.2464E−04 | −2.4176E−02 | 1.9132E−02 | −2.7903E−03 |
| A10 = | 1.2305E−07 | −4.5758E−05 | −6.3632E−05 | 7.4432E−03 | −9.3090E−03 | −3.5710E−04 |

| Surface # | 8 | 9 | 10 | 11 | 12 | 13 |
|---|---|---|---|---|---|---|
| k = | 2.0000E+01 | −7.0989E+00 | −9.3761E+00 | 1.4607E+00 | −3.4705E+01 | 6.1239E−01 |
| A4 = | −8.5570E−02 | −2.1095E−02 | −8.8326E−03 | −1.1630E−01 | −1.9505E−01 | −9.6897E−02 |
| A6 = | 4.9231E−03 | 3.8109E−03 | −1.4388E−03 | 6.3772E−02 | 7.4061E−02 | 3.1665E−02 |
| A8 = | 5.1587E−03 | 6.9525E−03 | 7.8752E−03 | −1.9565E−02 | −1.5277E−02 | −6.8889E−03 |
| A10 = | −4.7925E−03 | −2.5276E−03 | −2.1185E−03 | 2.5856E−03 | 5.5118E−04 | 7.8804E−04 |
| A12 = | | | | | −8.6869E−06 | −3.6680E−05 |
| A14 = | | | | | 5.4417E−05 | 5.8335E−07 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
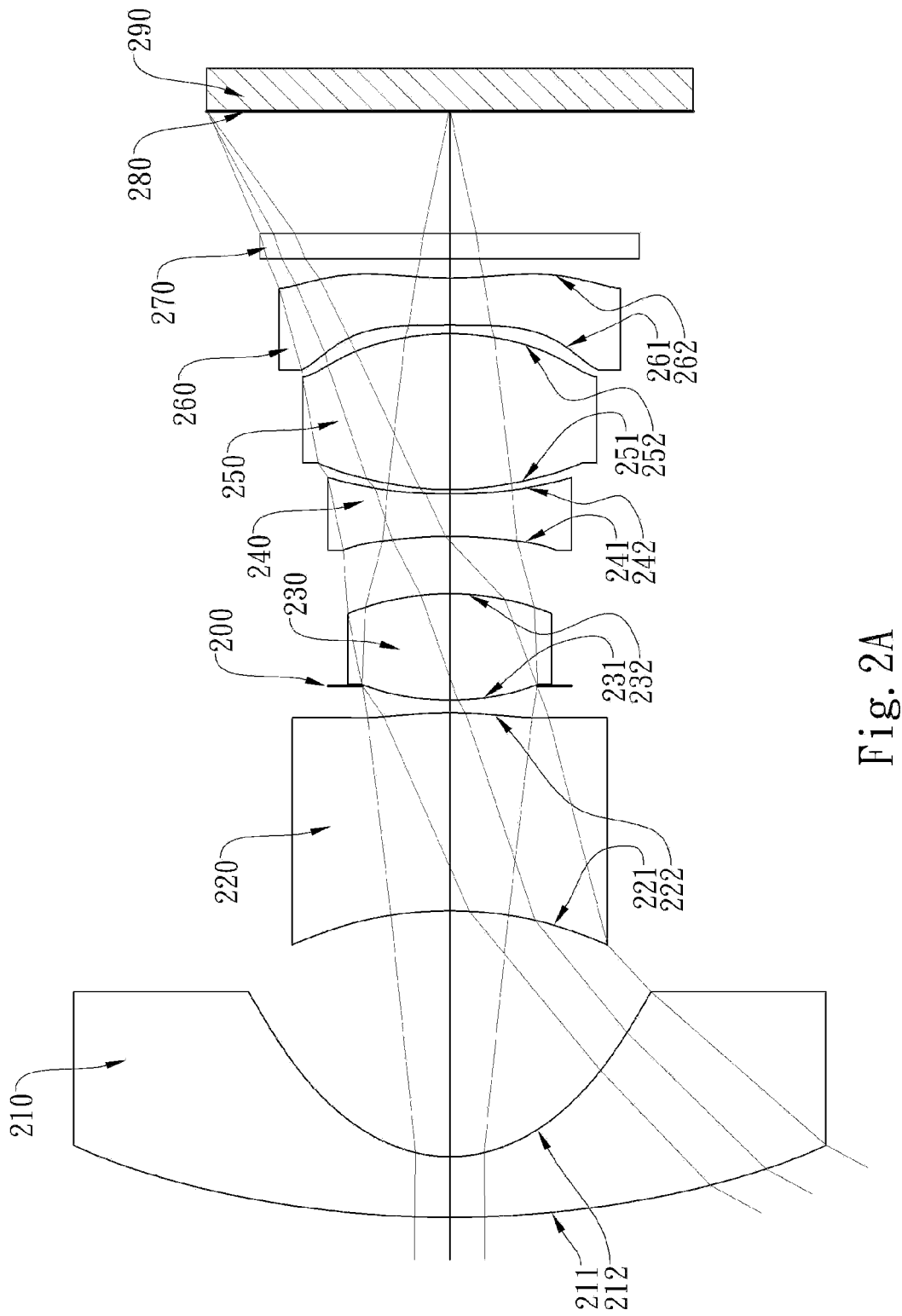
FIG. 2A is a schematic view of an imaging device according to the 2nd embodiment of the present disclosure.
Figure 2B:
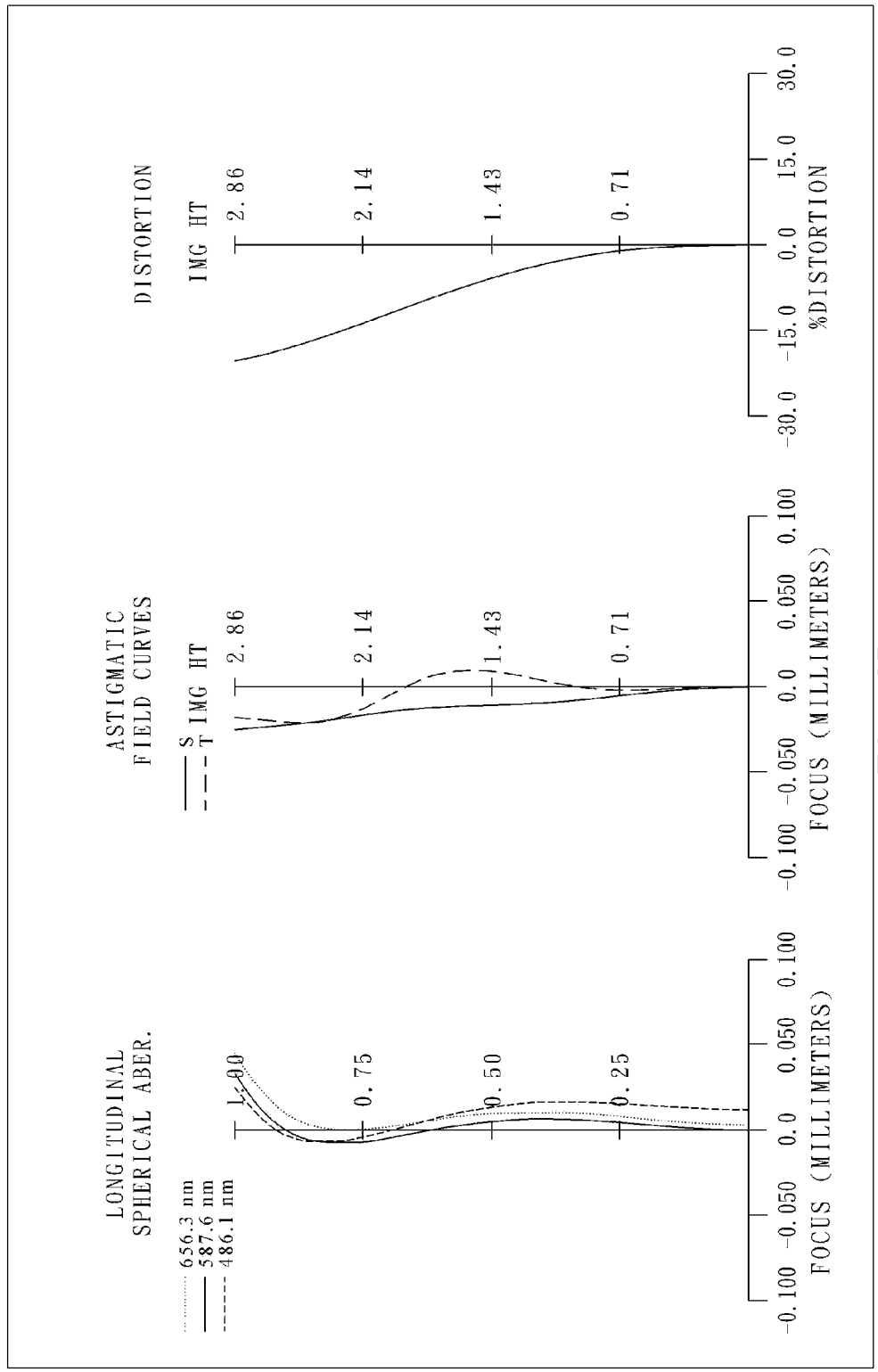
FIG. 2B shows spherical aberration curves, astigmatic field curves and a distortion curve of the imaging device according to the 2nd embodiment.

FIG. 2A is a schematic view of an imaging device according to the 2nd embodiment of the present disclosure. FIG. 2B shows, in order from left to right, spherical aberration curves, astigmatic field curves and a distortion curve of the imaging device according to the 2nd embodiment. In FIG. 2A, the imaging device includes the imaging lens assembly (not otherwise herein labeled) of the present disclosure and an image sensor 290. The imaging lens assembly includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image plane 280, wherein the imaging lens assembly has a total of six lens elements (210-260) with refractive power.

The first lens element 210 with negative refractive power has an object-side surface 211 being convex in a paraxial region thereof and an image-side surface 212 being concave in a paraxial region thereof. The first lens element 210 is made of glass material and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of glass material and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being concave in a paraxial region thereof and an image-side surface 262 being concave in a paraxial region thereof, wherein the image-side surface 262 of the sixth lens element 260 has at least one inflection point in an off-axis region thereof. The sixth lens element 260 is made of plastic material and has the object-side surface 261 and the image-side surface 262 being both aspheric.

The IR-cut filter 270 is made of glass and located between the sixth lens element 260 and the image plane 280, and will not affect the focal length of the imaging lens assembly. The image sensor 290 is disposed on or near the image plane 280 of the imaging lens assembly.

The detailed optical data of the 2nd embodiment are shown in Table 3 and the aspheric surface data are shown in Table 4 below.

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.97 | $|(R5 + R6)/(R5 - R6)|$ | 0.003 |
| Fno | 2.40 | $R12/|R11|$ | 0.07 |
| HFOV [deg.] | 61.5 | FOV [deg.] | 123.0 |
| T12/CT2 | 1.24 | f/f6 | −0.29 |
| V6 | 21.4 | $|f/fx|$ (max.) | 0.61 |
| $|(R3 + R4)/(R3 - R4)|$ | 26.08 | | |

TABLE 3

2nd Embodiment
f = 1.97 mm, Fno = 2.40, HFOV = 61.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.609 | ASP | 0.714 | Glass | 1.497 | 81.3 | −4.10 |
| 2 | | 1.699 | ASP | 2.889 | | | | |
| 3 | Lens 2 | −5.006 | ASP | 2.326 | Glass | 1.507 | 70.5 | 139.41 |
| 4 | | −5.405 | ASP | 0.319 | | | | |
| 5 | Ape. Stop | Plano | | −0.166 | | | | |
| 6 | Lens 3 | 3.346 | ASP | 1.246 | Plastic | 1.544 | 55.9 | 3.28 |
| 7 | | −3.328 | ASP | 0.676 | | | | |
| 8 | Lens 4 | −4.951 | ASP | 0.500 | Plastic | 1.650 | 21.4 | −4.33 |
| 9 | | 6.767 | ASP | 0.050 | | | | |
| 10 | Lens 5 | 3.190 | ASP | 1.832 | Plastic | 1.544 | 55.9 | 3.22 |
| 11 | | −3.091 | ASP | 0.100 | | | | |
| 12 | Lens 6 | −64.323 | ASP | 0.555 | Plastic | 1.650 | 21.4 | −6.68 |
| 13 | | 4.672 | ASP | 0.222 | | | | |
| 14 | IR-cut filter | Plano | | 0.300 | Glass | 1.517 | 64.2 | — |
| 15 | | Plano | | 1.436 | | | | |
| 16 | Image | Plano | | — | | | | |

Note:
Reference wavelength is 587.6 nm (d-line)

TABLE 4

| Aspheric Coefficients | | | | | | |
|---|---|---|---|---|---|---|
| Surface # | 1 | 2 | 3 | 4 | 6 | 7 |
| k = | −3.0181E+01 | −8.3689E−01 | 1.6566E+00 | −2.2669E+01 | 2.7586E+00 | 3.5999E−01 |
| A4 = | 1.0822E−03 | 2.2619E−03 | −9.3831E−03 | 1.7807E−02 | 1.2013E−02 | −1.6687E−03 |
| A6 = | −3.5888E−06 | 5.5704E−04 | 2.0406E−03 | 1.7131E−02 | −6.6649E−03 | −2.7252E−03 |
| A8 = | −1.2965E−06 | 2.3199E−04 | 2.6680E−04 | 3.8719E−03 | 1.5006E−03 | 1.1217E−03 |
| A10 = | 4.9671E−08 | −4.6701E−05 | −5.5540E−05 | −1.9734E−05 | −5.1013E−04 | 2.8161E−04 |

| Surface # | 8 | 9 | 10 | 11 | 12 | 13 |
|---|---|---|---|---|---|---|
| k = | −1.2751E+00 | 3.8563E+00 | −1.4254E+01 | 8.5610E−02 | −9.0000E+01 | 3.5389E+00 |
| A4 = | 4.3886E−02 | 2.4144E−02 | 1.5627E−02 | 1.4074E−02 | −6.1008E−02 | −7.4511E−02 |
| A6 = | −3.3085E−02 | −1.4713E−02 | −1.5890E−02 | −1.5002E−02 | −1.0361E−02 | 6.8223E−03 |
| A8 = | 3.3266E−03 | 4.4803E−03 | 1.0501E−02 | 9.5485E−04 | 2.4590E−03 | 1.5262E−03 |
| A10 = | −4.3107E−04 | −5.6828E−04 | −1.9363E−03 | 9.3348E−04 | −1.0313E−04 | −6.8184E−04 |
| A12 = | | | | | 2.6745E−04 | 1.1174E−04 |
| A14 = | | | | | −1.7561E−05 | −7.4617E−06 |

3rd Embodiment

Figure 3A:
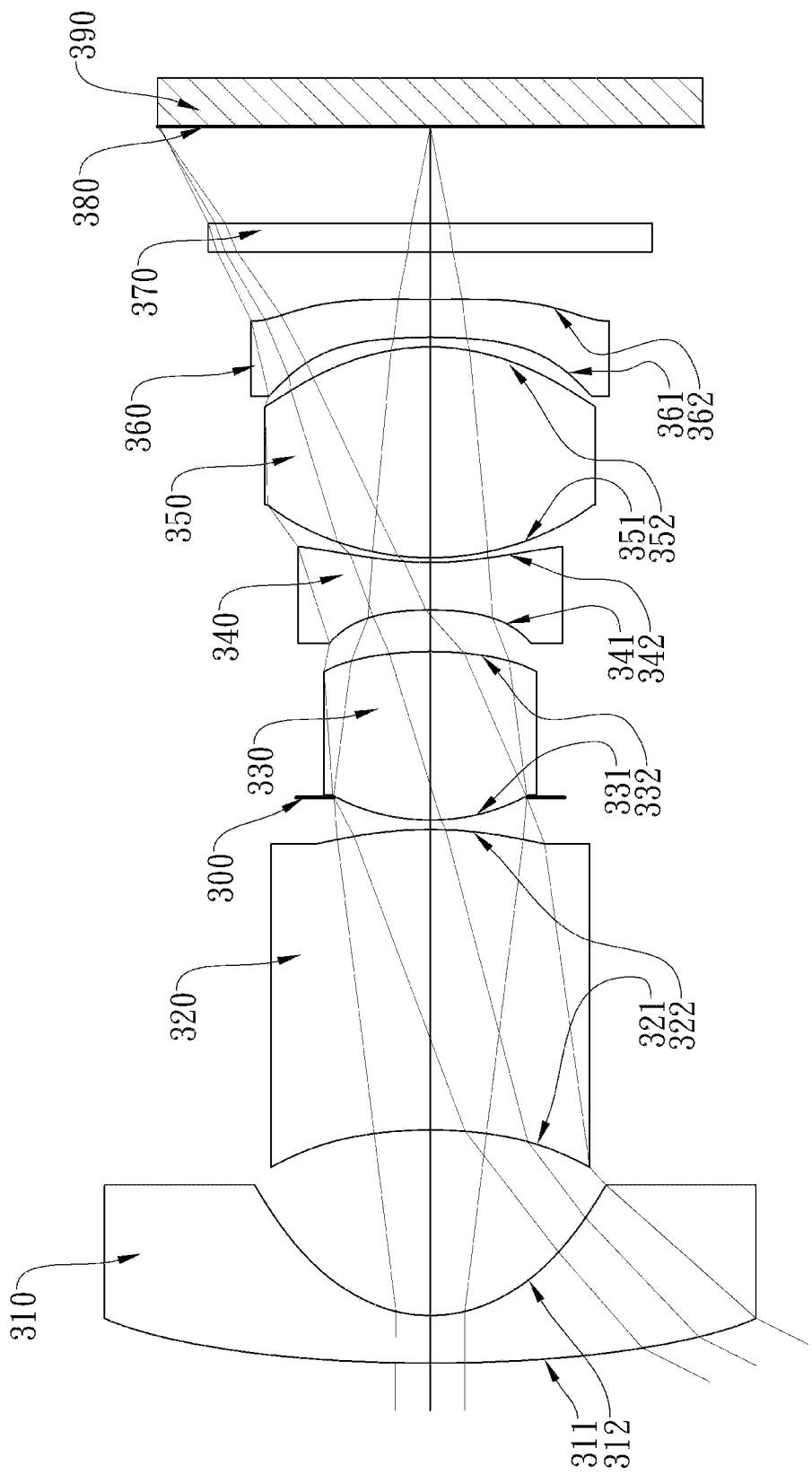
FIG. 3A is a schematic view of an imaging device according to the 3rd embodiment of the present disclosure.
Figure 3B:
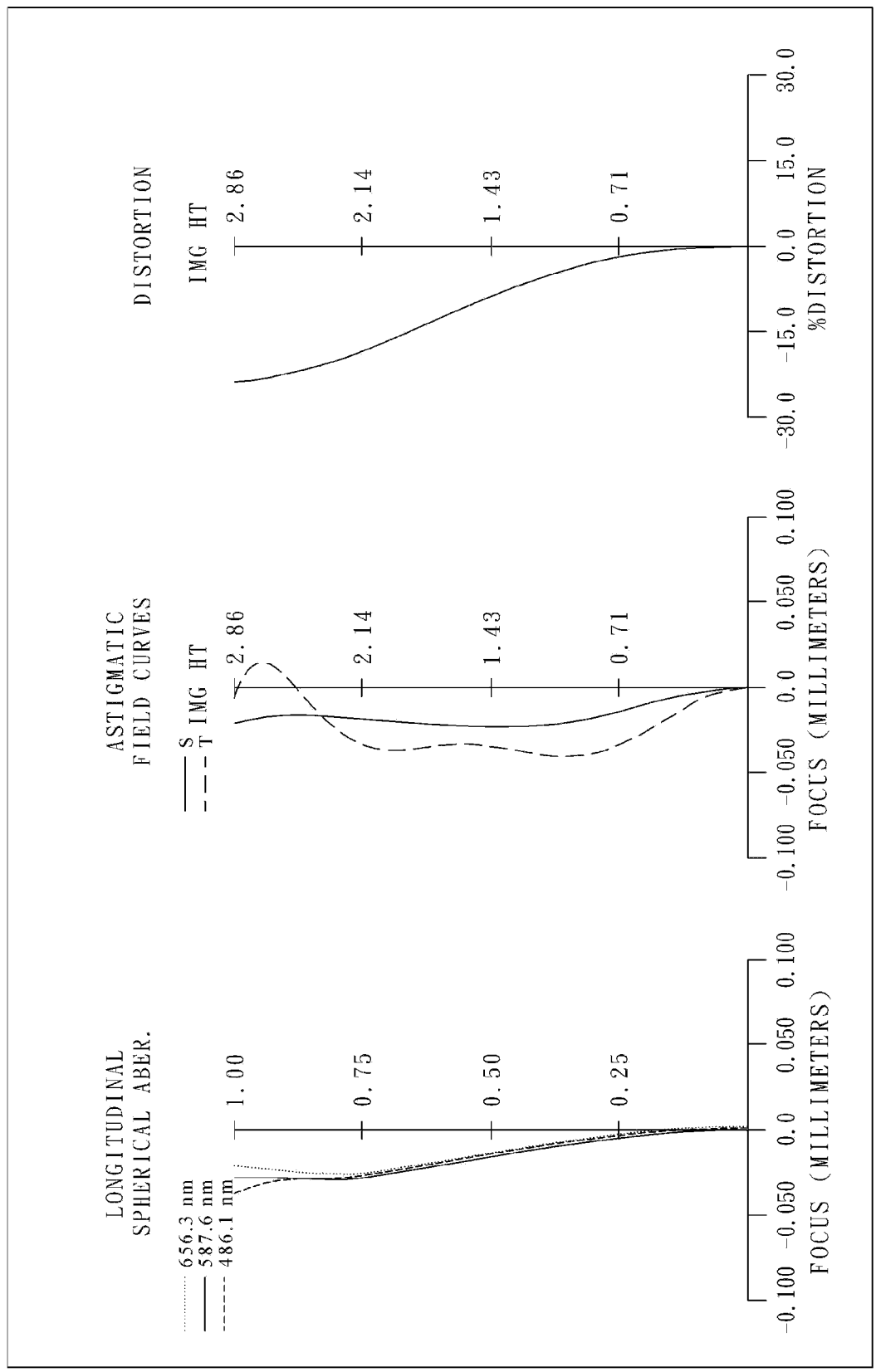
FIG. 3B shows spherical aberration curves, astigmatic field curves and a distortion curve of the imaging device according to the 3rd embodiment.

FIG. 3A is a schematic view of an imaging device according to the 3rd embodiment of the present disclosure. FIG. 3B shows, in order from left to right, spherical aberration curves, astigmatic field curves and a distortion curve of the imaging device according to the 3rd embodiment. In FIG. 3A, the imaging device includes the imaging lens assembly (not otherwise herein labeled) of the present disclosure and an image sensor 390. The imaging lens assembly includes, in order from an object side to an image side, a first lens element 310, a second lens element 320, an aperture stop 300, a third lens element 330, a fourth lens element 340, a fifth lens element 350, a sixth lens element 360, an IR-cut filter 370 and an image plane 380, wherein the imaging lens assembly has a total of six lens elements (310-360) with refractive power.

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of plastic material and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being concave in a paraxial region thereof and an image-side surface 362 being concave in a paraxial region thereof, wherein the image-side surface 362 of the sixth lens element 360 has at least one inflection point in an off-axis region thereof. The sixth lens element 360 is made of plastic material and has the object-side surface 361 and the image-side surface 362 being both aspheric.

The IR-cut filter 370 is made of glass and located between the sixth lens element 360 and the image plane 380, and will not affect the focal length of the imaging lens assembly. The image sensor 390 is disposed on or near the image plane 380 of the imaging lens assembly.

The detailed optical data of the 3rd embodiment are shown in Table 5 and the aspheric surface data are shown in Table 6 below.

TABLE 5

3rd Embodiment
f = 1.90 mm, Fno = 2.60, HFOV = 63.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 17.697 | ASP | 0.500 | Plastic | 1.530 | 55.8 | −3.11 |
| 2 | | 1.494 | ASP | 1.951 | | | | |
| 3 | Lens 2 | −4.914 | ASP | 3.158 | Plastic | 1.583 | 30.2 | 22.76 |
| 4 | | −4.435 | ASP | 0.340 | | | | |
| 5 | Ape. Stop | Plano | | −0.240 | | | | |
| 6 | Lens 3 | 2.181 | ASP | 1.769 | Plastic | 1.530 | 55.8 | 3.04 |
| 7 | | −4.448 | ASP | 0.439 | | | | |
| 8 | Lens 4 | −3.562 | ASP | 0.500 | Plastic | 1.660 | 22.0 | −2.51 |
| 9 | | 3.267 | ASP | 0.050 | | | | |
| 10 | Lens 5 | 2.773 | ASP | 2.216 | Plastic | 1.530 | 55.8 | 2.81 |
| 11 | | −2.328 | ASP | 0.100 | | | | |
| 12 | Lens 6 | −7.243 | ASP | 0.400 | Plastic | 1.660 | 22.0 | −9.47 |
| 13 | | 46.413 | ASP | 0.500 | | | | |
| 14 | IR-cut filter | Plano | | 0.300 | Glass | 1.517 | 64.2 | — |
| 15 | | Plano | | 1.017 | | | | |
| 16 | Image | Plano | | — | | | | |

Note:
Reference wavelength is 587.6 nm (d-line)

TABLE 6

Aspheric Coefficients

| Surface # | 1 | 2 | 3 | 4 | 6 | 7 |
|---|---|---|---|---|---|---|
| k = | 4.8781E+00 | −8.4204E−01 | 4.7983E+00 | 1.5284E+00 | 3.4265E−01 | 9.4372E+00 |
| A4 = | 6.5268E−04 | 6.8057E−03 | −7.9962E−03 | 5.5925E−03 | −1.5550E−04 | −1.9412E−02 |
| A6 = | −9.5817E−06 | 3.0941E−03 | −2.0039E−04 | 2.7696E−03 | 1.8305E−03 | −1.5605E−05 |
| A8 = | −9.9844E−07 | 1.1138E−04 | 1.8269E−04 | 2.3192E−04 | −5.9627E−04 | 2.3953E−04 |
| A10 = | 2.8652E−07 | −1.3744E−04 | 1.5542E−04 | −1.0052E−04 | −1.7261E−03 | −8.1178E−04 |

TABLE 6-continued

Aspheric Coefficients

| Surface # | 8 | 9 | 10 | 11 | 12 | 13 |
|---|---|---|---|---|---|---|
| k = | 3.8198E+00 | −1.7042E+01 | −8.9283E+00 | 5.9418E−02 | 5.7529E+00 | −9.0000E+01 |
| A4 = | −9.8789E−02 | −3.5401E−03 | 2.9223E−02 | 1.5884E−02 | −4.3836E−02 | −4.3496E−02 |
| A6 = | −2.7735E−02 | −8.7511E−03 | −3.0702E−03 | −3.2916E−03 | −4.0971E−03 | 2.2665E−03 |
| A8 = | 1.2696E−02 | 6.4451E−03 | 4.8172E−04 | 1.0311E−03 | 5.2458E−04 | 1.2079E−03 |
| A10 = | −1.5143E−02 | −1.6659E−03 | −2.0118E−05 | 8.4316E−05 | −4.7541E−04 | −3.1196E−04 |
| A12 = | | | | | 2.6745E−04 | 1.1174E−04 |
| A14 = | | | | | −1.7561E−05 | −7.4617E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.90 | |(R5 + R6)/(R5 − R6)| | 0.34 |
| Fno | 2.60 | R12/|R11| | 6.41 |
| HFOV [deg.] | 63.5 | FOV [deg.] | 127.0 |
| T12/CT2 | 0.62 | f/f6 | −0.20 |
| V6 | 22.0 | |f/fx| (max) | 0.76 |
| |(R3 + R4)/(R3 − R4)| | 19.55 | | |

4th Embodiment

Figure 4A:
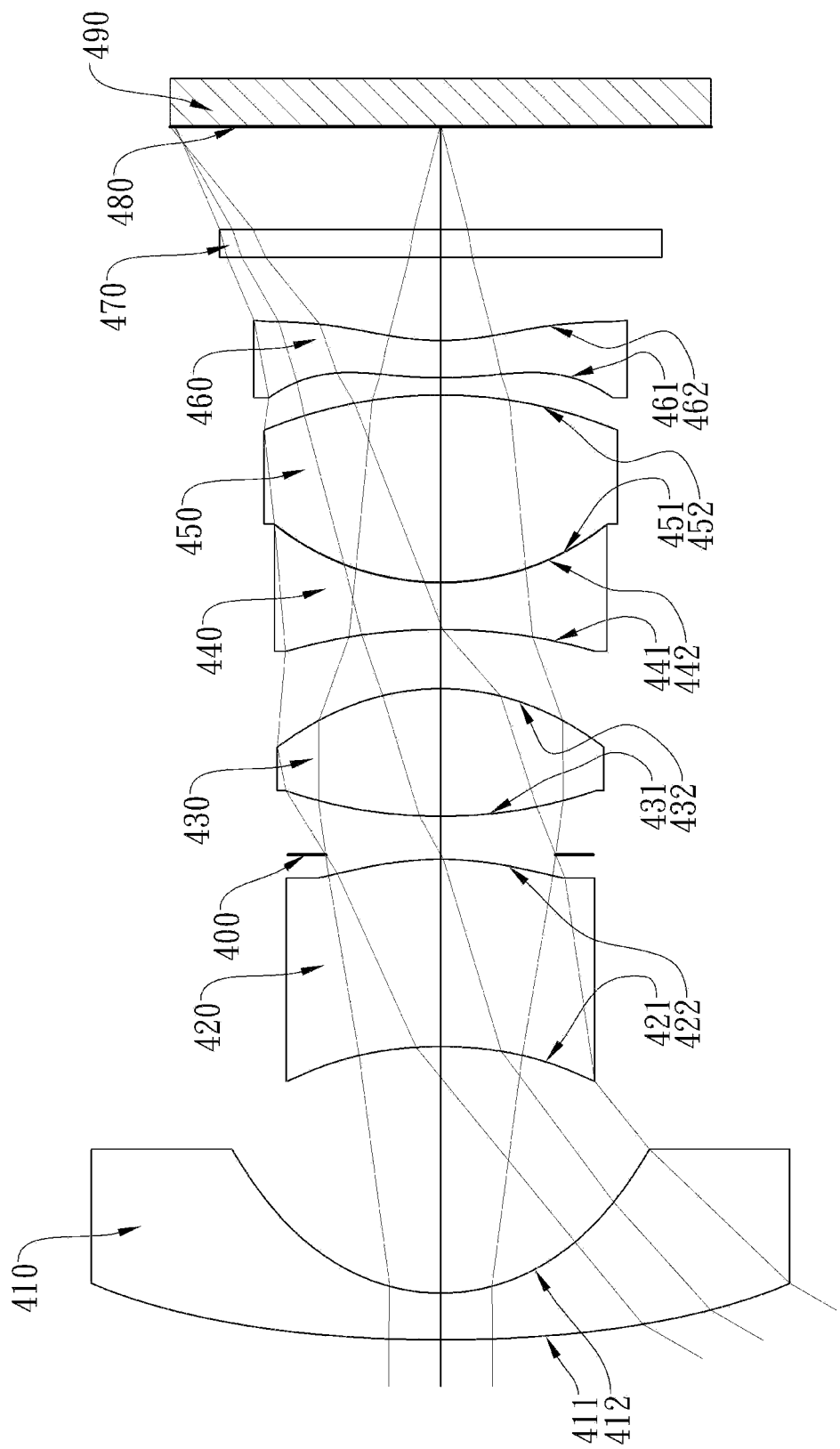
FIG. 4A is a schematic view of an imaging device according to the 4th embodiment of the present disclosure.
Figure 4B:
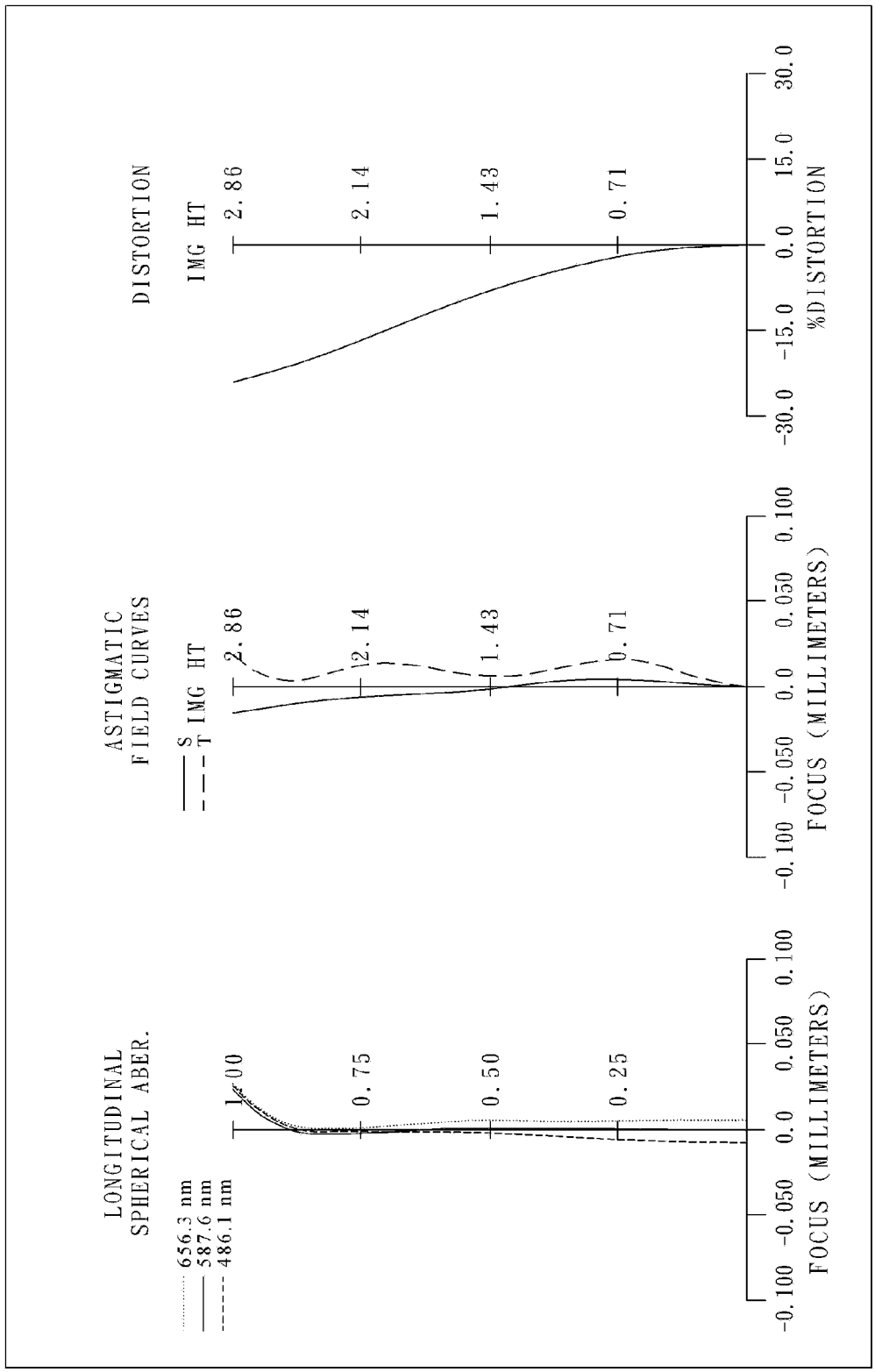
FIG. 4B shows spherical aberration curves, astigmatic field curves and a distortion curve of the imaging device according to the 4th embodiment.

FIG. 4A is a schematic view of an imaging device according to the 4th embodiment of the present disclosure. FIG. 4B shows, in order from left to right, spherical aberration curves, astigmatic field curves and a distortion curve of the imaging device according to the 4th embodiment. In FIG. 4A, the imaging device includes the imaging lens assembly (not otherwise herein labeled) of the present disclosure and an image sensor 490. The imaging lens assembly includes, in order from an object side to an image side, a first lens element 410, a second lens element 420, an aperture stop 400, a third lens element 430, a fourth lens element 440, a fifth lens element 450, a sixth lens element 460, an IR-cut filter 470 and an image plane 480, wherein the imaging lens assembly has a total of six lens elements (410-460) with refractive power.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of glass material and has the object-side surface 441 and the image-side surface 442 being both spherical.

The fifth lens element 450 with positive refractive power has an object-side surface 451 being convex in a paraxial region thereof and an image-side surface 452 being convex in a paraxial region thereof. The fifth lens element 450 is made of glass material and has the object-side surface 451 and the image-side surface 452 being both spherical. Moreover, the object-side surface 451 of the fifth lens element 450 is cemented with the image-side surface 442 of the fourth lens element 440.

The sixth lens element 460 with negative refractive power has an object-side surface 461 being convex in a paraxial region thereof and an image-side surface 462 being concave in a paraxial region thereof, wherein the image-side surface 462 of the sixth lens element 460 has at least one inflection point in an off-axis region thereof. The sixth lens element 460 is made of plastic material and has the object-side surface 461 and the image-side surface 462 being both aspheric.

The IR-cut filter 470 is made of glass and located between the sixth lens element 460 and the image plane 480, and will not affect the focal length of the imaging lens assembly. The image sensor 490 is disposed on or near the image plane 480 of the imaging lens assembly.

The detailed optical data of the 4th embodiment are shown in Table 7 and the aspheric surface data are shown in Table 8 below.

TABLE 7

4th Embodiment
f = 2.21 mm, Fno = 2.00, HFOV = 59.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 15.687 | ASP | 0.500 | Plastic | 1.544 | 55.9 | −4.44 |
| 2 | | 2.071 | ASP | 2.642 | | | | |

TABLE 7-continued

4th Embodiment
f = 2.21 mm, Fno = 2.00, HFOV = 59.9 deg.

| Surface # | | Curvature Radius | | Thickness | Material | Index | Abbe # | Focal Length |
|---|---|---|---|---|---|---|---|---|
| 3 | Lens 2 | −4.328 | ASP | 2.007 | Plastic | 1.640 | 23.3 | 15.21 |
| 4 | | −3.538 | ASP | 0.050 | | | | |
| 5 | Ape. Stop | Plano | | 0.412 | | | | |
| 6 | Lens 3 | 5.502 | ASP | 1.367 | Plastic | 1.544 | 55.9 | 3.46 |
| 7 | | −2.610 | ASP | 0.636 | | | | |
| 8 | Lens 4 | −6.010 | SPH | 0.500 | Glass | 1.847 | 23.8 | −2.23 |
| 9 | | 2.857 | SPH | 0.005 | Cement | | | |
| 10 | Lens 5 | 2.857 | SPH | 2.008 | Glass | 1.804 | 46.5 | 2.54 |
| 11 | | −4.930 | SPH | 0.183 | | | | |
| 12 | Lens 6 | 4.147 | ASP | 0.400 | Plastic | 1.640 | 23.3 | −12.37 |
| 13 | | 2.618 | ASP | 0.891 | | | | |
| 14 | IR-cut filter | Plano | | 0.300 | Glass | 1.517 | 64.2 | — |
| 15 | | Plano | | 1.100 | | | | |
| 16 | Image | Plano | | — | | | | |

Note:
Reference wavelength is 587.6 nm (d-line)

TABLE 8

Aspheric Coefficients

| Surface # | 1 | 2 | 3 | 4 |
|---|---|---|---|---|
| k = | 2.8190E+00 | −6.0270E−01 | 1.7216E+00 | −4.4330E+00 |
| A4 = | 7.5808E−04 | 4.5143E−03 | −7.9103E−03 | 2.0262E−03 |
| A6 = | −1.7015E−05 | −2.4722E−04 | 4.2553E−04 | 1.5884E−03 |
| A8 = | −2.9863E−07 | 3.6553E−04 | 6.0294E−04 | 1.4384E−04 |
| A10 = | 8.0532E−08 | −5.1778E−05 | −2.3619E−05 | 4.1808E−04 |

| Surface # | 6 | 7 | 12 | 13 |
|---|---|---|---|---|
| k = | 1.4407E+00 | 1.6121E−02 | −1.8294E+01 | −1.7916E+00 |
| A4 = | 5.8179E−03 | 1.9017E−03 | −4.0077E−02 | −6.1190E−02 |
| A6 = | −3.0328E−03 | 9.4215E−04 | −7.8735E−03 | 8.0938E−03 |
| A8 = | 5.5116E−04 | −1.4296E−04 | 5.1277E−03 | 9.4435E−04 |
| A10 = | −3.0947E−05 | 6.0066E−05 | −1.5704E−03 | −5.7626E−04 |
| A12 = | | | 2.6745E−04 | 1.1174E−04 |
| A14 = | | | −1.7561E−05 | −7.4617E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.21 | |(R5 + R6)/(R5 − R6)| | 0.36 |
| Fno | 2.00 | R12/|R11| | 0.63 |
| HFOV [deg.] | 59.9 | FOV [deg.] | 119.8 |
| T12/CT2 | 1.32 | f/f6 | −0.18 |
| V6 | 23.3 | |f/fx| (max) | 0.99 |
| |(R3 + R4)/(R3 − R4)| | 9.96 | | |

5th Embodiment

Figure 5A:
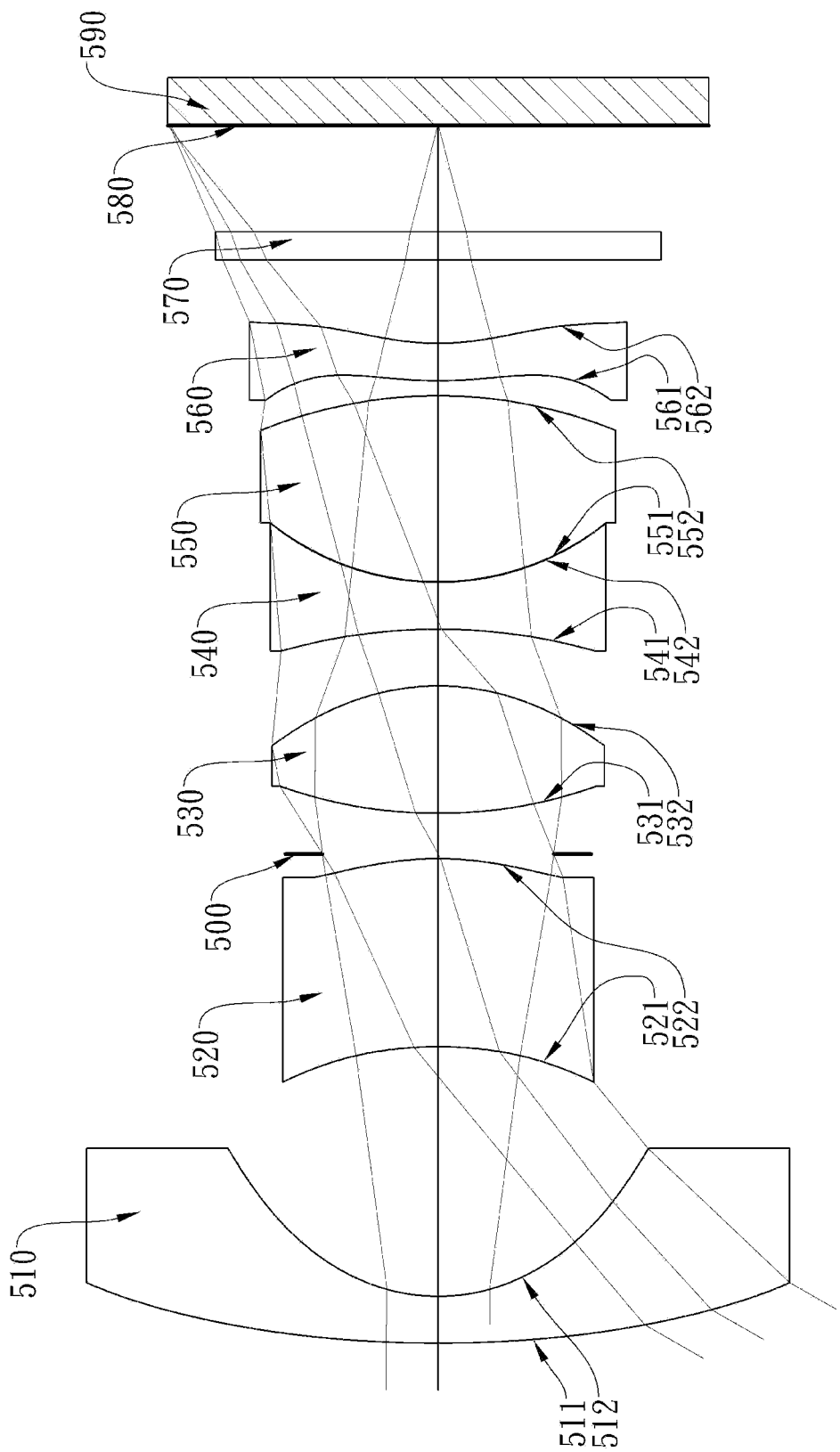
FIG. 5A is a schematic view of an imaging device according to the 5th embodiment of the present disclosure.
Figure 5B:
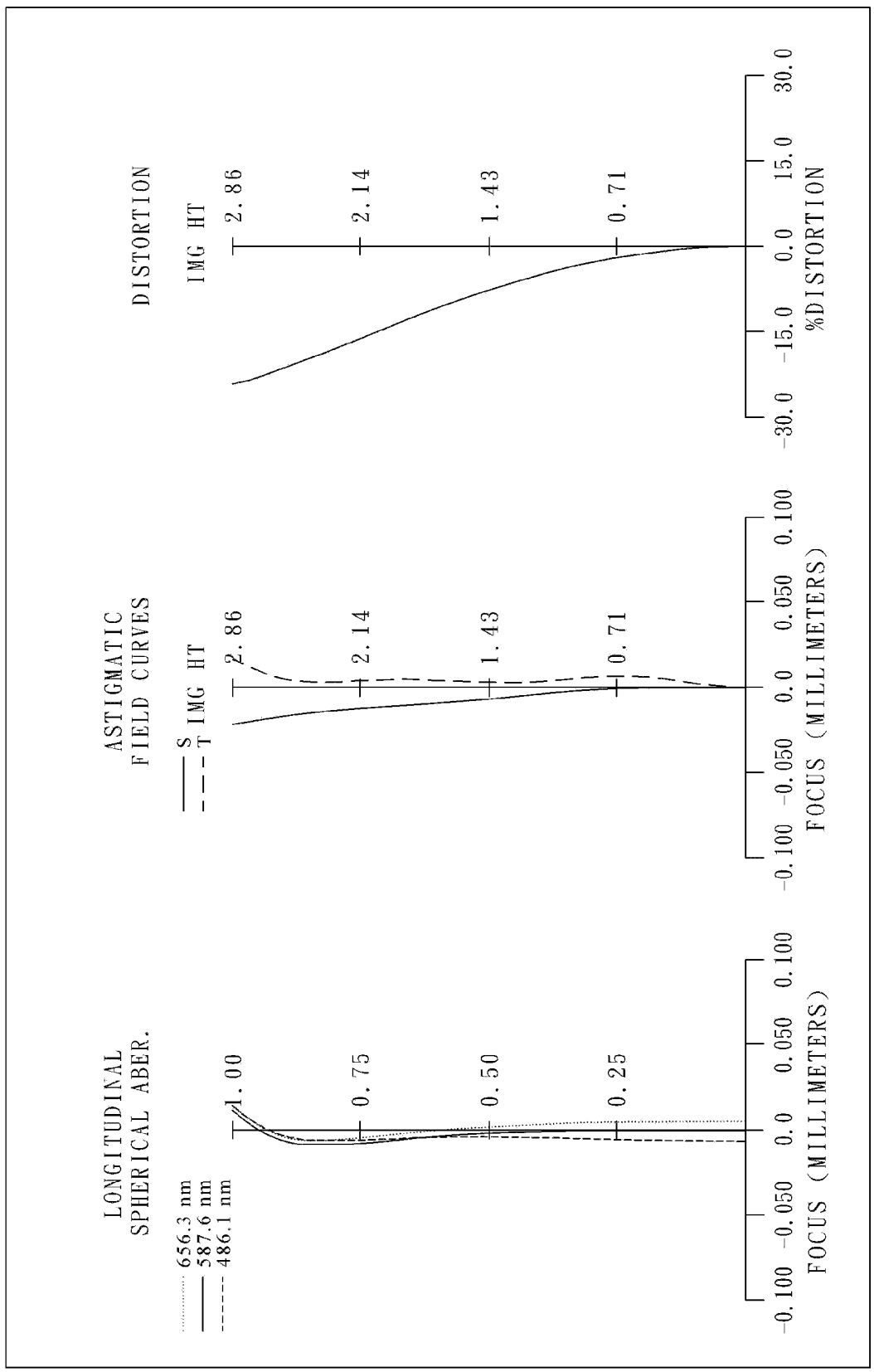
FIG. 5B shows spherical aberration curves, astigmatic field curves and a distortion curve of the imaging device according to the 5th embodiment.

FIG. 5A is a schematic view of an imaging device according to the 5th embodiment of the present disclosure. FIG. 5B shows, in order from left to right, spherical aberration curves, astigmatic field curves and a distortion curve of the imaging device according to the 5th embodiment. In FIG. 5A, the imaging device includes the imaging lens assembly (not otherwise herein labeled) of the present disclosure and an image sensor 590. The imaging lens assembly includes, in order from an object side to an image side, a first lens element 510, a second lens element 520, an aperture stop 500, a third lens element 530, a fourth lens element 540, a fifth lens element 550, a sixth lens element 560, an IR-cut filter 570 and an image plane 580, wherein the imaging lens assembly has a total of six lens elements (510-560) with refractive power.

The first lens element 510 with negative refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with negative refractive power has an object-side surface 541 being concave in a paraxial region thereof and an image-side surface 542 being concave in a paraxial region thereof. The fourth lens element 540 is made of glass material and has the object-side surface 541 and the image-side surface 542 being both spherical.

The fifth lens element 550 with positive refractive power has an object-side surface 551 being convex in a paraxial region thereof and an image-side surface 552 being convex in a paraxial region thereof. The fifth lens element 550 is made of glass material and has the object-side surface 551 and the image-side surface 552 being both spherical. Moreover, the object-side surface 551 of the fifth lens element 550 is cemented with the image-side surface 542 of the fourth lens element 540.

The sixth lens element 560 with negative refractive power has an object-side surface 561 being convex in a paraxial region thereof and an image-side surface 562 being concave in a paraxial region thereof, wherein the image-side surface 562 of the sixth lens element 560 has at least one inflection point in an off-axis region thereof. The sixth lens element 560 is made of plastic material and has the object-side surface 561 and the image-side surface 562 being both aspheric.

The IR-cut filter 570 is made of glass and located between the sixth lens element 560 and the image plane 580, and will not affect the focal length of the imaging lens assembly. The image sensor 590 is disposed on or near the image plane 580 of the imaging lens assembly.

The detailed optical data of the 5th embodiment are shown in Table 9 and the aspheric surface data are shown in Table 10 below.

TABLE 9

5th Embodiment
f = 2.20 mm, Fno = 1.98, HFOV = 60.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 13.136 | ASP | 0.500 | Plastic | 1.544 | 55.9 | −4.45 |
| 2 | | 2.016 | ASP | 2.665 | | | | |
| 3 | Lens 2 | −4.337 | ASP | 2.008 | Plastic | 1.640 | 23.3 | 15.24 |
| 4 | | −3.544 | ASP | 0.050 | | | | |
| 5 | Ape. Stop | Plano | | 0.436 | | | | |
| 6 | Lens 3 | 5.416 | ASP | 1.359 | Plastic | 1.544 | 55.9 | 3.45 |
| 7 | | −2.620 | ASP | 0.607 | | | | |
| 8 | Lens 4 | −6.136 | SPH | 0.500 | Glass | 1.847 | 23.8 | −2.25 |
| 9 | | 2.857 | SPH | 0.005 | Cement | | | |
| 10 | Lens 5 | 2.857 | SPH | 1.988 | Glass | 1.804 | 46.5 | 2.55 |
| 11 | | −5.039 | SPH | 0.158 | | | | |
| 12 | Lens 6 | 4.107 | ASP | 0.400 | Plastic | 1.640 | 23.3 | −12.60 |
| 13 | | 2.617 | ASP | 0.891 | | | | |
| 14 | IR-cut filter | Plano | | 0.300 | Glass | 1.517 | 64.2 | — |
| 15 | | Plano | | 1.134 | | | | |
| 16 | Image | Plano | | — | | | | |

Note:
Reference wavelength is 587.6 nm (d-line)

TABLE 10

Aspheric Coefficients

| Surface # | 1 | 2 | 3 | 4 |
|---|---|---|---|---|
| k = | 1.1541E+00 | −6.0673E−01 | 1.6408E+00 | −4.3443E+00 |
| A4 = | 3.8522E−04 | 4.6191E−03 | −7.7130E−03 | 2.5786E−03 |
| A6 = | −5.1583E−06 | −4.6850E−04 | 4.7042E−04 | 1.4324E−03 |
| A8 = | −6.7867E−07 | 3.8253E−04 | 6.0696E−04 | 2.7411E−04 |
| A10 = | 9.0395E−08 | −5.4389E−05 | −3.7312E−05 | 3.5038E−04 |

| Surface # | 6 | 7 | 12 | 13 |
|---|---|---|---|---|
| k = | 1.5634E+00 | 1.2433E−02 | −1.6503E+01 | −1.7156E+00 |
| A4 = | 5.9646E−03 | 1.9300E−03 | −3.4957E−02 | −5.4877E−02 |
| A6 = | −2.9956E−03 | 1.0310E−03 | −1.0512E−02 | 5.3837E−03 |
| A8 = | 5.4099E−04 | −1.4537E−04 | 5.8275E−03 | 1.2855E−03 |
| A10 = | −3.8720E−05 | 5.3552E−05 | −1.7420E−03 | −5.3990E−04 |
| A12 = | | | 2.9026E−04 | 9.4559E−05 |
| A14 = | | | −1.8684E−05 | −6.0587E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.20 | |(R5 + R6)/(R5 − R6)| | 0.35 |
| Fno | 1.98 | R12/|R11| | 0.64 |
| HFOV [deg.] | 60.1 | FOV [deg.] | 120.2 |
| T12/CT2 | 1.33 | f/f6 | −0.17 |
| V6 | 23.3 | |f/fx| (max) | 0.98 |
| |(R3 + R4)/(R3 − R4)| | 9.94 | | |

6th Embodiment

Figure 6A:
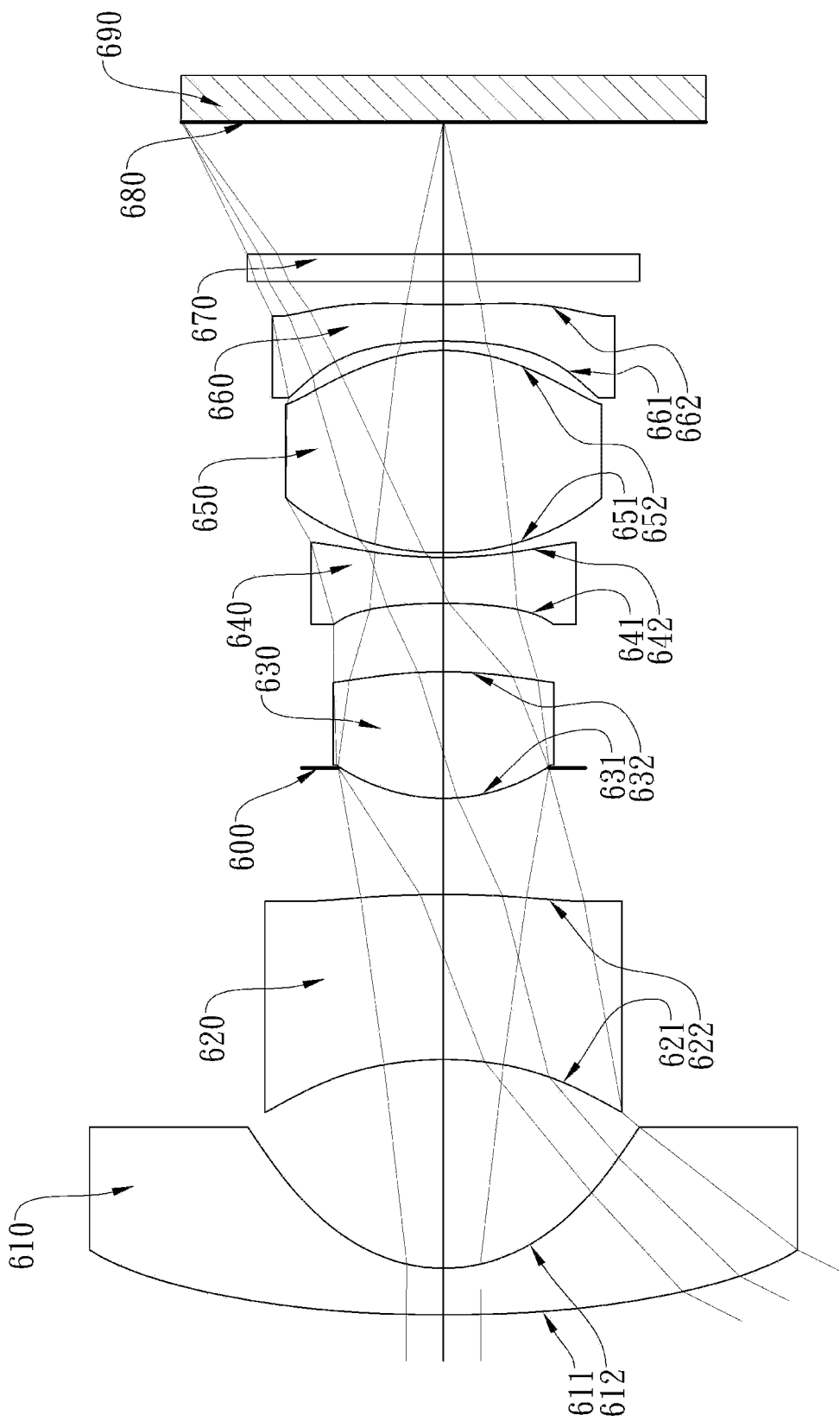
FIG. 6A is a schematic view of an imaging device according to the 6th embodiment of the present disclosure.
Figure 6B:
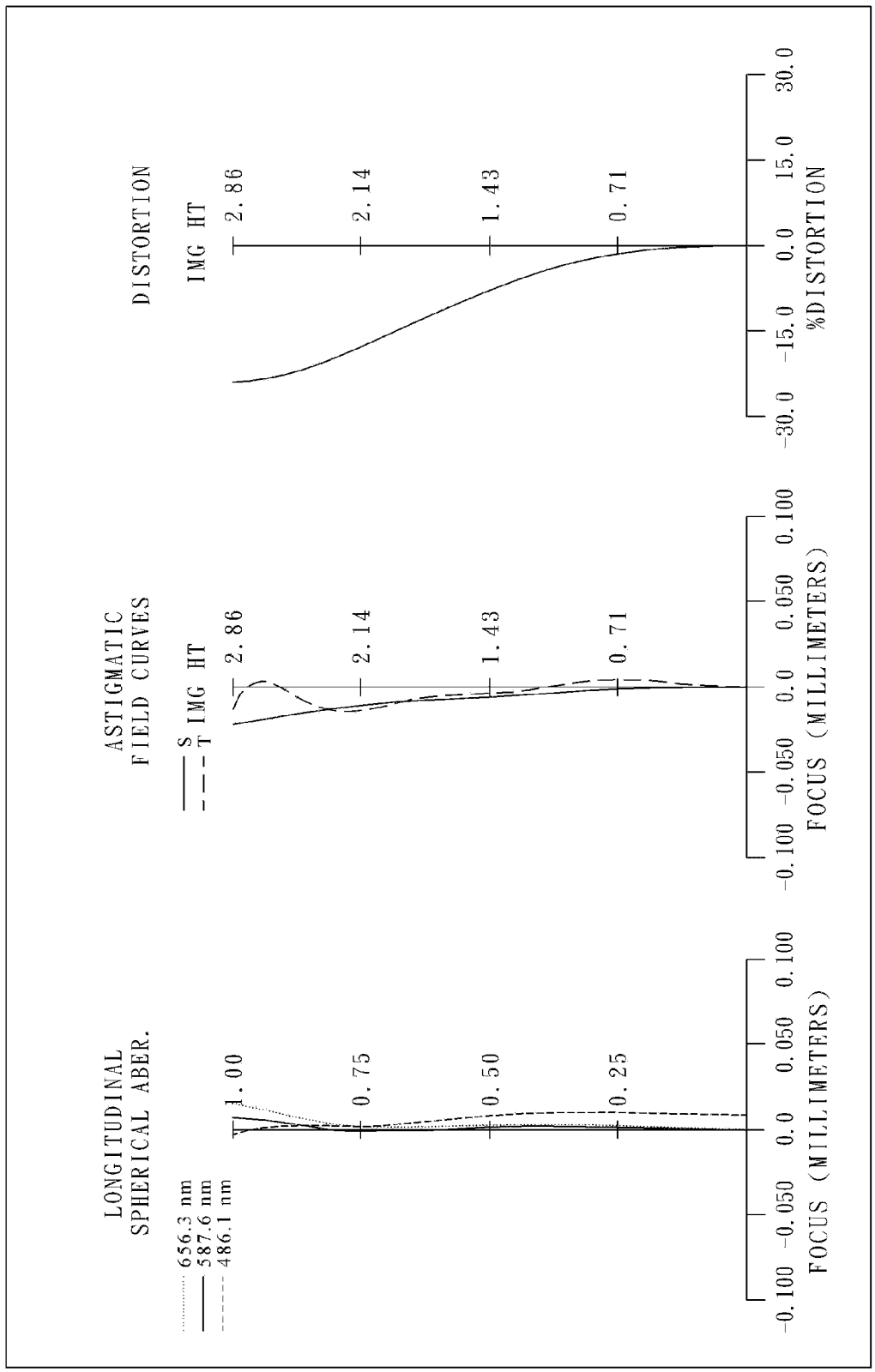
FIG. 6B shows spherical aberration curves, astigmatic field curves and a distortion curve of the imaging device according to the 6th embodiment.

FIG. 6A is a schematic view of an imaging device according to the 6th embodiment of the present disclosure. FIG. 6B shows, in order from left to right, spherical aberration curves, astigmatic field curves and a distortion curve of the imaging device according to the 6th embodiment. In FIG. 6A, the imaging device includes the imaging lens assembly (not otherwise herein labeled) of the present disclosure and an image sensor 690. The imaging lens assembly includes, in order from an object side to an image side, a first lens element 610, a second lens element 620, an aperture stop 600, a third lens element 630, a fourth lens element 640, a fifth lens element 650, a sixth lens element 660, an IR-cut filter 670 and an image plane 680, wherein the imaging lens assembly has a total of six lens elements (610-660) with refractive power.

The first lens element 610 with negative refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with negative refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with negative refractive power has an object-side surface 641 being concave in a paraxial region thereof and an image-side surface 642 being concave in a paraxial region thereof. The fourth lens element 640 is made of plastic material and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of glass material and has the object-side surface 651 and the image-side surface 652 being both aspheric.

The sixth lens element 660 with negative refractive power has an object-side surface 661 being concave in a paraxial region thereof and an image-side surface 662 being concave in a paraxial region thereof, wherein the image-side surface 662 of the sixth lens element 660 has at least one inflection point in an off-axis region thereof. The sixth lens element 660 is made of plastic material and has the object-side surface 661 and the image-side surface 662 being both aspheric.

The IR-cut filter 670 is made of glass and located between the sixth lens element 660 and the image plane 680, and will not affect the focal length of the imaging lens assembly. The image sensor 690 is disposed on or near the image plane 680 of the imaging lens assembly.

The detailed optical data of the 6th embodiment are shown in Table 11 and the aspheric surface data are shown in Table 12 below.

TABLE 11

6th Embodiment
f = 1.91 mm, Fno = 2.35, HFOV = 63.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 16.882 | ASP | 0.507 | Plastic | 1.544 | 55.9 | −3.64 |
| 2 | | 1.754 | ASP | 2.275 | | | | |
| 3 | Lens 2 | −3.891 | ASP | 1.798 | Plastic | 1.544 | 55.9 | −10.66 |
| 4 | | −13.738 | ASP | 1.381 | | | | |
| 5 | Ape. Stop | Plano | | −0.332 | | | | |
| 6 | Lens 3 | 2.002 | ASP | 1.380 | Plastic | 1.544 | 55.9 | 2.80 |
| 7 | | −4.853 | ASP | 0.746 | | | | |
| 8 | Lens 4 | −5.594 | ASP | 0.500 | Plastic | 1.639 | 23.5 | −4.17 |
| 9 | | 5.266 | ASP | 0.050 | | | | |
| 10 | Lens 5 | 2.976 | ASP | 2.206 | Glass | 1.486 | 85.2 | 2.88 |
| 11 | | −1.995 | ASP | 0.100 | | | | |
| 12 | Lens 6 | −5.677 | ASP | 0.400 | Plastic | 1.639 | 23.5 | −5.65 |
| 13 | | 10.192 | ASP | 0.250 | | | | |
| 14 | IR-cut filter | Plano | | 0.300 | Glass | 1.517 | 64.2 | — |
| 15 | | Plano | | 1.438 | | | | |
| 16 | Image | Plano | | — | | | | |

Note:
Reference wavelength is 587.6 nm (d-line)

TABLE 12

Aspheric Coefficients

| Surface # | 1 | 2 | 3 | 4 | 6 | 7 |
|---|---|---|---|---|---|---|
| k = | 1.5167E+01 | −1.0420E+00 | 1.5500E+00 | −7.6781E+00 | −1.0273E+00 | 6.8274E+00 |
| A4 = | 1.6294E−03 | 1.0245E−02 | −6.5943E−03 | −1.0128E−02 | 5.6187E−03 | 2.3979E−02 |
| A6 = | −2.2311E−04 | 2.3613E−03 | −1.0275E−04 | 6.1671E−03 | 7.0422E−03 | −1.6033E−03 |
| A8 = | 1.2901E−05 | −2.4005E−04 | 8.5458E−04 | −9.8435E−04 | −2.4744E−03 | 1.6804E−03 |
| A10 = | −2.4649E−07 | −3.5303E−05 | −5.9943E−05 | 2.9262E−04 | 9.7123E−04 | 5.0304E−04 |

| Surface # | 8 | 9 | 10 | 11 | 12 | 13 |
|---|---|---|---|---|---|---|
| k = | −1.8956E+01 | 9.6588E+00 | −1.5354E+01 | −7.1606E−01 | 7.9329E+00 | 8.4762E+00 |
| A4 = | −8.3997E−03 | 6.1623E−03 | 5.6050E−02 | 2.6520E−02 | −4.9816E−02 | −6.0460E−02 |
| A6 = | −5.3181E−02 | −2.2852E−02 | −1.2566E−02 | −5.0905E−03 | 9.8813E−03 | 1.1864E−02 |
| A8 = | 2.9816E−02 | 9.0722E−03 | 2.2721E−03 | −2.8501E−06 | −5.3725E−03 | −1.2136E−03 |
| A10 = | −1.2370E−02 | −2.5546E−03 | −1.5623E−04 | 4.1262E−04 | 7.3457E−04 | −9.8816E−05 |
| A12 = | | | | | 2.6745E−04 | 1.1174E−04 |
| A14 = | | | | | −1.7561E−05 | −7.4617E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.91 | |(R5 + R6)/(R5 − R6)| | 0.42 |
| Fno | 2.35 | R12/|R11| | 1.80 |
| HFOV [deg.] | 63.4 | FOV [deg.] | 126.8 |
| T12/CT2 | 1.27 | f/f6 | −0.34 |
| V6 | 23.5 | |f/fx| (max) | 0.68 |
| |(R3 + R4)/(R3 − R4)| | 1.79 | | |

7th Embodiment

Figure 7A:
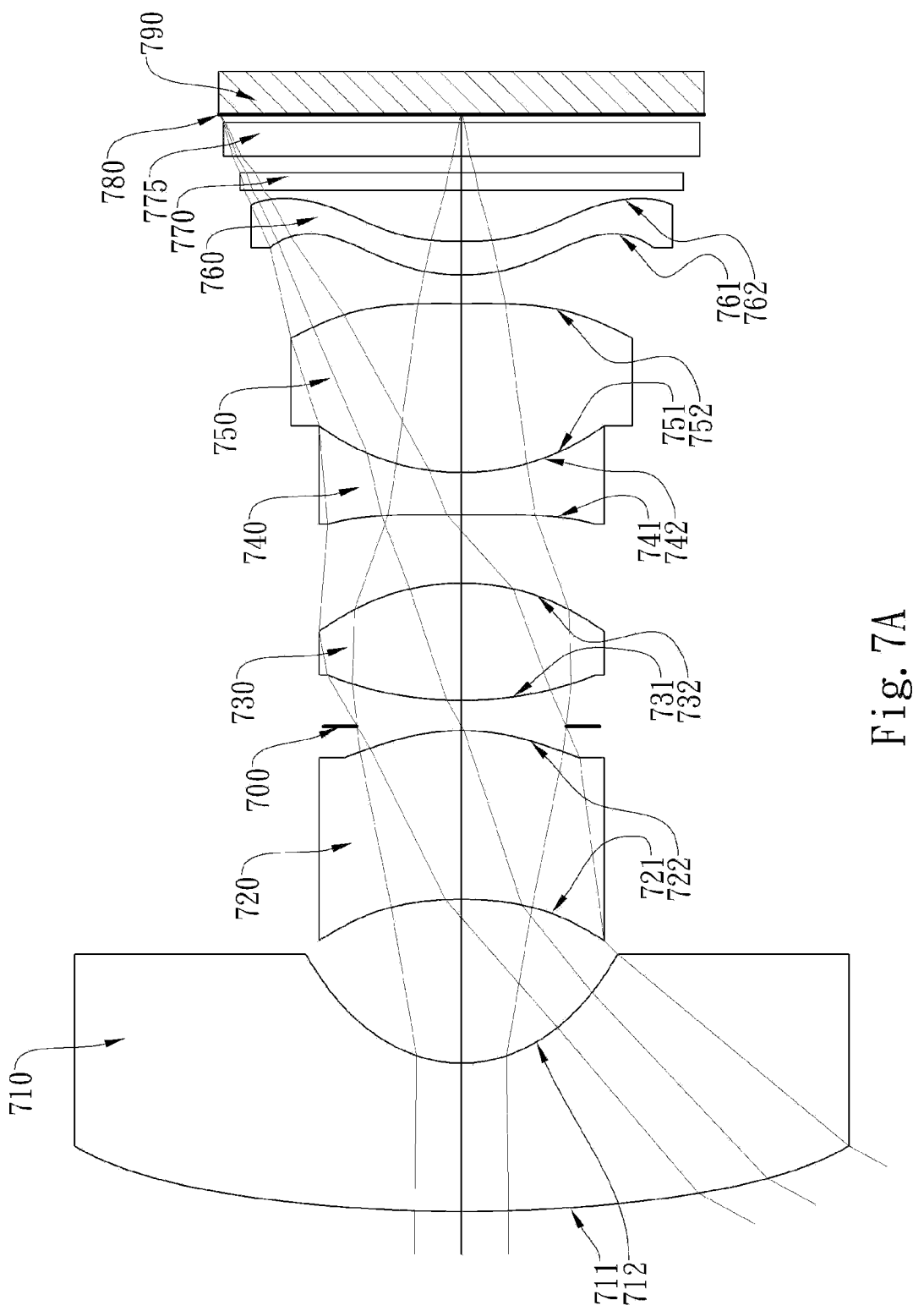
FIG. 7A is a schematic view of an imaging device according to the 7th embodiment of the present disclosure.
Figure 7B:
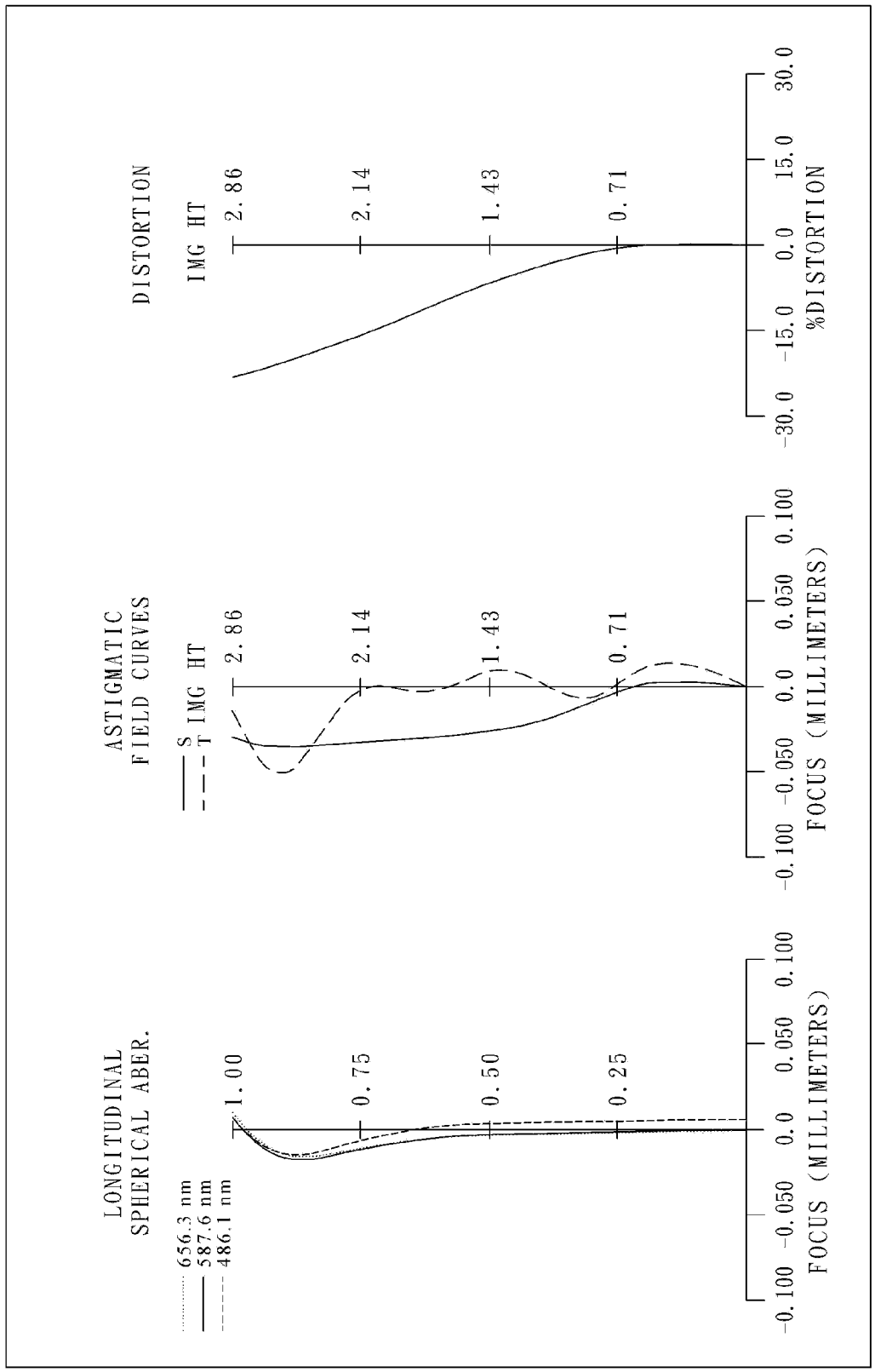
FIG. 7B shows spherical aberration curves, astigmatic field curves and a distortion curve of the imaging device according to the 7th embodiment.

FIG. 7A is a schematic view of an imaging device according to the 7th embodiment of the present disclosure. FIG. 7B shows, in order from left to right, spherical aberration curves, astigmatic field curves and a distortion curve of the imaging device according to the 7th embodiment. In FIG. 7A, the imaging device includes the imaging lens assembly (not otherwise herein labeled) of the present disclosure and an image sensor 790. The imaging lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 770, a cover glass 775 and an image plane 780, wherein the imaging lens assembly has a total of six lens elements (710-760) with refractive power.

The first lens element 710 with negative refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of glass material and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of glass material and has the object-side surface 741 being aspheric and the image-side surface 742 being spherical.

The fifth lens element 750 with positive refractive power has an object-side surface 751 being convex in a paraxial region thereof and an image-side surface 752 being concave in a paraxial region thereof. The fifth lens element 750 is made of glass material and has the object-side surface 751 being spherical and the image-side surface 752 being aspheric. Moreover, the object-side surface 751 of the fifth lens element 750 is bonded with the image-side surface 742 of the fourth lens element 740.

The sixth lens element 760 with positive refractive power has an object-side surface 761 being convex in a paraxial region thereof and an image-side surface 762 being concave in a paraxial region thereof, wherein the image-side surface 762 of the sixth lens element 760 has at least one inflection point in an off-axis region thereof. The sixth lens element 760 is made of plastic material and has the object-side surface 761 and the image-side surface 762 being both aspheric.

The IR-cut filter 770 is made of glass and located between the sixth lens element 760 and the image plane 780, and will not affect the focal length of the imaging lens assembly. The cover glass 775 is disposed between the IR-cut filter 770 and the image plane 780. The image sensor 790 is disposed on or near the image plane 780 of the imaging lens assembly.

The detailed optical data of the 7th embodiment are shown in Table 13 and the aspheric surface data are shown in Table 14 below.

TABLE 13

7th Embodiment
f = 2.05 mm, Fno = 1.85, HFOV = 61.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 16.580 | ASP | 1.759 | Plastic | 1.535 | 55.7 | −3.47 |
| 2 | | 1.608 | ASP | 1.941 | | | | |
| 3 | Lens 2 | −4.242 | ASP | 2.001 | Plastic | 1.544 | 55.9 | 8.85 |
| 4 | | −2.630 | ASP | 0.050 | | | | |
| 5 | Ape. Stop | Plano | | 0.309 | | | | |
| 6 | Lens 3 | 4.729 | ASP | 1.387 | Glass | 1.497 | 81.3 | 3.84 |
| 7 | | −2.886 | ASP | 0.812 | | | | |
| 8 | Lens 4 | 89.900 | ASP | 0.500 | Glass | 1.839 | 23.9 | −3.53 |
| 9 | Lens 5 | 2.857 | SPH | 2.000 | Glass | 1.497 | 81.3 | 6.01 |
| 10 | | 50.730 | ASP | 0.340 | | | | |
| 11 | Lens 6 | 2.275 | ASP | 0.400 | Plastic | 1.535 | 55.7 | 7.14 |
| 12 | | 5.280 | ASP | 0.600 | | | | |
| 13 | IR-cut filter | Plano | | 0.210 | Glass | 1.517 | 64.2 | — |
| 14 | | Plano | | 0.200 | | | | |
| 15 | Cover glass | Plano | | 0.400 | Glass | 1.517 | 64.2 | — |
| 16 | | Plano | | 0.090 | | | | |
| 17 | Image | Plano | | — | | | | |

Note:
Reference wavelength is 587.6 nm (d-line)

TABLE 14

Aspheric Coefficients

| Surface # | 1 | 2 | 3 | 4 | 6 |
|---|---|---|---|---|---|
| k = | −2.1826E+01 | −1.0712E+00 | 3.4914E+00 | −4.1250E+00 | 2.3988E+00 |
| A4 = | −5.5431E−04 | 1.1645E−02 | −1.5523E−02 | −1.3489E−02 | 4.6076E−03 |
| A6 = | 1.2500E−04 | 2.0705E−03 | −2.9505E−03 | 6.2242E−03 | −2.8625E−03 |
| A8 = | −5.6679E−06 | 1.0359E−03 | 2.2790E−03 | −1.7722E−03 | 7.0915E−04 |
| A10 = | 1.1749E−07 | −2.3032E−04 | −3.7717E−05 | 8.3496E−04 | −1.3561E−04 |

| Surface # | 7 | 8 | 10 | 11 | 12 |
|---|---|---|---|---|---|
| k = | 7.8171E−01 | −1.0000E+00 | −9.0000E+01 | −8.9183E+00 | 2.6442E+00 |
| A4 = | −9.5407E−03 | −2.5000E−02 | −5.9188E−02 | 1.1310E−01 | 1.3173E−01 |
| A6 = | 5.5956E−03 | 4.1037E−03 | 1.2111E−02 | −6.2840E−02 | −7.2296E−02 |
| A8 = | −3.8724E−04 | −9.7732E−04 | −1.2659E−03 | 1.4194E−02 | 1.5554E−02 |
| A10 = | 4.5411E−05 | 7.8961E−05 | 6.0861E−05 | −2.1945E−03 | −1.7005E−03 |
| A12 = | | | | 2.6745E−04 | 8.8670E−05 |
| A14 = | | | | −1.7561E−05 | −1.8619E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.05 | |(R5 + R6)/(R5 − R6)| | 0.24 |
| Fno | 1.85 | R12/|R11| | 2.32 |
| HFOV [deg.] | 61.5 | FOV [deg.] | 123.0 |
| T12/CT2 | 0.97 | f/f6 | 0.29 |
| V6 | 55.7 | |f/fx| (max) | 0.59 |
| |(R3 + R4)/(R3 − R4)| | 4.26 | | |

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising, in order from an object side to an image side:
   a first lens element with negative refractive power having an object-side surface being convex in a paraxial region thereof and an image-side surface being concave in a paraxial region thereof;
   a second lens element with refractive power having an object-side surface being concave in a paraxial region thereof and an image-side surface being convex in a paraxial region thereof;
   a third lens element with refractive power having an object-side surface being convex in a paraxial region thereof;
   a fourth lens element having negative refractive power;
   a fifth lens element having positive refractive power; and
   a sixth lens element with refractive power having an image-side surface being concave in a paraxial region thereof, wherein the image-side surface of the sixth lens element has at least one inflection point in an off-axis region thereof, and both of an object-side surface and the image-side surface of the sixth lens element are aspheric;
   wherein the imaging lens assembly has a total of six lens elements with refractive power, and at least three lens elements among the first through the sixth lens elements of the imaging lens assembly are made of plastic material.

2. The imaging lens assembly of claim 1, wherein the third lens element has positive refractive power.

3. The imaging lens assembly of claim 2, wherein a curvature radius of the object-side surface of the sixth lens element is R11, a curvature radius of the image-side surface of the sixth lens element is R12, and the following condition is satisfied:

$$0 < R12/|R11| < 2.0.$$

4. The imaging lens assembly of claim 3, wherein a maximal field of view of the imaging lens assembly is FOV, and the following condition is satisfied:

$$110\ \text{deg.} < FOV < 200\ \text{deg.}$$

5. The imaging lens assembly of claim 1, wherein the fourth lens element has an object-side surface being concave in a paraxial region thereof and an image-side surface being concave in a paraxial region thereof, and the fifth lens element has an object-side surface being convex in a paraxial region thereof and an image-side surface being convex in a paraxial region thereof.

6. The imaging lens assembly of claim 5, wherein a focal length of the imaging lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following condition is satisfied:

$$|f/fx| < 1.2;\ \text{and}\ x = 1\sim 6.$$

7. The imaging lens assembly of claim 1, wherein a curvature radius of the object-side surface of the third lens element is R5, a curvature radius of the image-side surface of the third lens element is R6, and the following condition is satisfied:

$$|(R5+R6)/(R5-R6)| < 0.60.$$

8. The imaging lens assembly of claim 1, wherein an f-number of the imaging lens assembly is Fno, and the following condition is satisfied:

$$1.6 < Fno < 2.4.$$

9. The imaging lens assembly of claim 1, wherein a curvature radius of the object-side surface of the second lens element is R3, a curvature radius of the image-side surface of the second lens element is R4, and the following condition is satisfied:

$$3.0 < |(R3+R4)/(R3-R4)|.$$

10. The imaging lens assembly of claim 1, wherein an axial distance between the first lens element and the second lens element is T12, a central thickness of the second lens element is CT2, and the following condition is satisfied:

$$0.5 < T12/CT2 < 1.5.$$

11. An imaging device, comprising:
    the imaging lens assembly of claim 1; and
    an image sensor, wherein the image sensor is disposed on the image side of the imaging lens assembly.

12. A vehicle photographing device, comprising:
    the imaging device of claim 11.

13. An imaging lens assembly comprising, in order from an object side to an image side:
    a first lens element with negative refractive power having an image-side surface being concave in a paraxial region thereof;
    a second lens element with refractive power having an object-side surface being concave in a paraxial region thereof and an image-side surface being convex in a paraxial region thereof;
    a third lens element with positive refractive power having an object-side surface being convex in a paraxial region thereof and an image-side surface being convex in a paraxial region thereof;
    a fourth lens element having negative refractive power;
    a fifth lens element with positive refractive power having an object-side surface being convex in a paraxial region thereof; and
    a sixth lens element with refractive power having an image-side surface being concave in a paraxial region thereof, wherein the image-side surface of the sixth lens element has at least one inflection point in an off-axis region thereof, and both of an object-side surface and the image-side surface of the sixth lens element are aspheric;
    wherein the imaging lens assembly has a total of six lens elements with refractive power, and at least three lens elements among the first through the sixth lens elements of the imaging lens assembly are made of plastic material.

14. The imaging lens assembly of claim 13, wherein the first lens element has an object-side surface being convex in a paraxial region thereof.

15. The imaging lens assembly of claim 13, wherein a curvature radius of the object-side surface of the second lens element is R3, a curvature radius of the image-side surface of the second lens element is R4, and the following condition is satisfied:

$$3.0 < |(R3+R4)/(R3-R4)|.$$

16. The imaging lens assembly of claim 13, wherein a curvature radius of the object-side surface of the sixth lens element is R11, a curvature radius of the image-side surface of the sixth lens element is R12, and the following condition is satisfied:

$$0 < R12/|R11| < 1.0.$$

17. The imaging lens assembly of claim 13, wherein a focal length of the imaging lens assembly is f, a focal length of the sixth lens element is f6, and the following condition is satisfied:

$$-0.50 < f/f6 < 0.$$

18. An imaging lens assembly comprising, in order from an object side to an image side:
    a first lens element with negative refractive power having an image-side surface being concave in a paraxial region thereof;
    a second lens element with refractive power having an object-side surface being concave in a paraxial region thereof and an image-side surface being convex in a paraxial region thereof;
    a third lens element having refractive power;
    a fourth lens element having negative refractive power;
    a fifth lens element having positive refractive power; and
    a sixth lens element with negative refractive power having an image-side surface being concave in a paraxial region thereof, wherein the image-side surface of the sixth lens element has at least one inflection point in an off-axis region thereof, and both of an object-side surface and the image-side surface of the sixth lens element are aspheric;
    wherein the imaging lens assembly has a total of six lens elements with refractive power, and at least three lens elements among the first through the sixth lens elements of the imaging lens assembly are made of plastic material.

19. The imaging lens assembly of claim 18, wherein an axial distance between the first lens element and the second lens element is T12, a central thickness of the second lens element is CT2, and the following condition is satisfied:

$$0.5 < T12/CT2 < 1.5.$$

20. The imaging lens assembly of claim 18, wherein the fourth lens element has an object-side surface being concave in a paraxial region thereof and an image-side surface being concave in a paraxial region thereof, and the fifth lens element has an object-side surface being convex in a paraxial region thereof and an image-side surface being convex in a paraxial region thereof.

21. The imaging lens assembly of claim 18, wherein a curvature radius of the object-side surface of the second lens element is R3, a curvature radius of the image-side surface of the second lens element is R4, and the following condition is satisfied:

$$3.0 < |(R3+R4)/(R3-R4)|.$$

22. The imaging lens assembly of claim 18, wherein a curvature radius of the object-side surface of the sixth lens element is R11, a curvature radius of the image-side surface of the sixth lens element is R12, and the following condition is satisfied:

$$0 < R12/|R11| < 2.0.$$

23. The imaging lens assembly of claim 18, wherein an Abbe number of the sixth lens element is V6, the following condition is satisfied:

$$V6 < 30.$$

* * * * *